United States Patent [19]
Hasegawa et al.

[11] Patent Number: 5,745,265
[45] Date of Patent: Apr. 28, 1998

[54] OPTICAL ELEMENT UTILIZED FOR OPTICAL STORAGE UNIT AND OPTICAL DEVICE INCLUDING THE OPTICAL ELEMENT

[75] Inventors: Shinya Hasegawa; Kohichi Tezuka; Hiroyasu Yoshikawa, all of Kawasaki, Japan

[73] Assignee: Fujitsu Limited, Kawasaki, Japan

[21] Appl. No.: 597,710

[22] Filed: Feb. 7, 1996

[30] Foreign Application Priority Data

Feb. 7, 1995 [JP] Japan ................................. 7-018865
Jan. 19, 1996 [JP] Japan ................................. 8-007737

[51] Int. Cl.$^6$ .............................. G02B 5/32; G02B 5/18; G11B 7/135
[52] U.S. Cl. .............................. 359/15; 359/566; 369/112
[58] Field of Search .............................. 359/15, 1, 566, 359/569, 576, 573; 369/112, 109, 44.23, 44.12

[56] References Cited

U.S. PATENT DOCUMENTS

| | | | |
|---|---|---|---|
| 5,016,954 | 5/1991 | Onayama et al. | 359/15 |
| 5,065,380 | 11/1991 | Yokota | 369/44.12 |
| 5,068,751 | 11/1991 | Braat et al. | 359/566 |
| 5,231,620 | 7/1993 | Ohuchida | 369/112 |
| 5,363,226 | 11/1994 | Strasser et al. | 359/566 |
| 5,422,870 | 6/1995 | Kojima et al. | 369/112 |
| 5,453,963 | 9/1995 | Katayama et al. | 369/44.23 |
| 5,493,425 | 2/1996 | Yang | 369/103 |

FOREIGN PATENT DOCUMENTS

| | | |
|---|---|---|
| 0305169 | 8/1988 | European Pat. Off. . |
| 0452793 | 4/1991 | European Pat. Off. . |
| 0581519 | 7/1993 | European Pat. Off. . |
| 0612068 | 2/1994 | European Pat. Off. . |
| 59-231736 | 12/1984 | Japan . |
| 60-5425 | 1/1985 | Japan . |
| 62-141651 | 6/1987 | Japan . |
| 6308309 | 11/1994 | Japan . |
| 6309688 | 11/1994 | Japan . |
| 6338090 | 12/1994 | Japan . |

*Primary Examiner*—Jon W. Henry
*Attorney, Agent, or Firm*—Greer, Burns & Crain, Ltd.

[57] ABSTRACT

An optical element for writing and reading signals for an optical storage unit, and an optical device including the optical element, include an optical substrate made of a material allowing the transmission of a laser beam emitted from a semiconductor laser and disposed between the semiconductor laser and an optical storage medium; a first hologram formed on the optical substrate in such a manner as to transmit the laser beam, and to allow it to be incident into the optical storage medium and to diffract the laser beam reflected by the optical storage medium inside the optical substrate; and a second hologram formed on the optical substrate in such a manner as to transmit one polarization component of the laser beam diffracted by the first hologram and propagating inside the optical substrate, to diffract the other polarization component and to thus separate both polarization components. A signal representing the state of the optical storage medium is detected by detecting the difference of the intensities between the polarization components so separated.

29 Claims, 22 Drawing Sheets

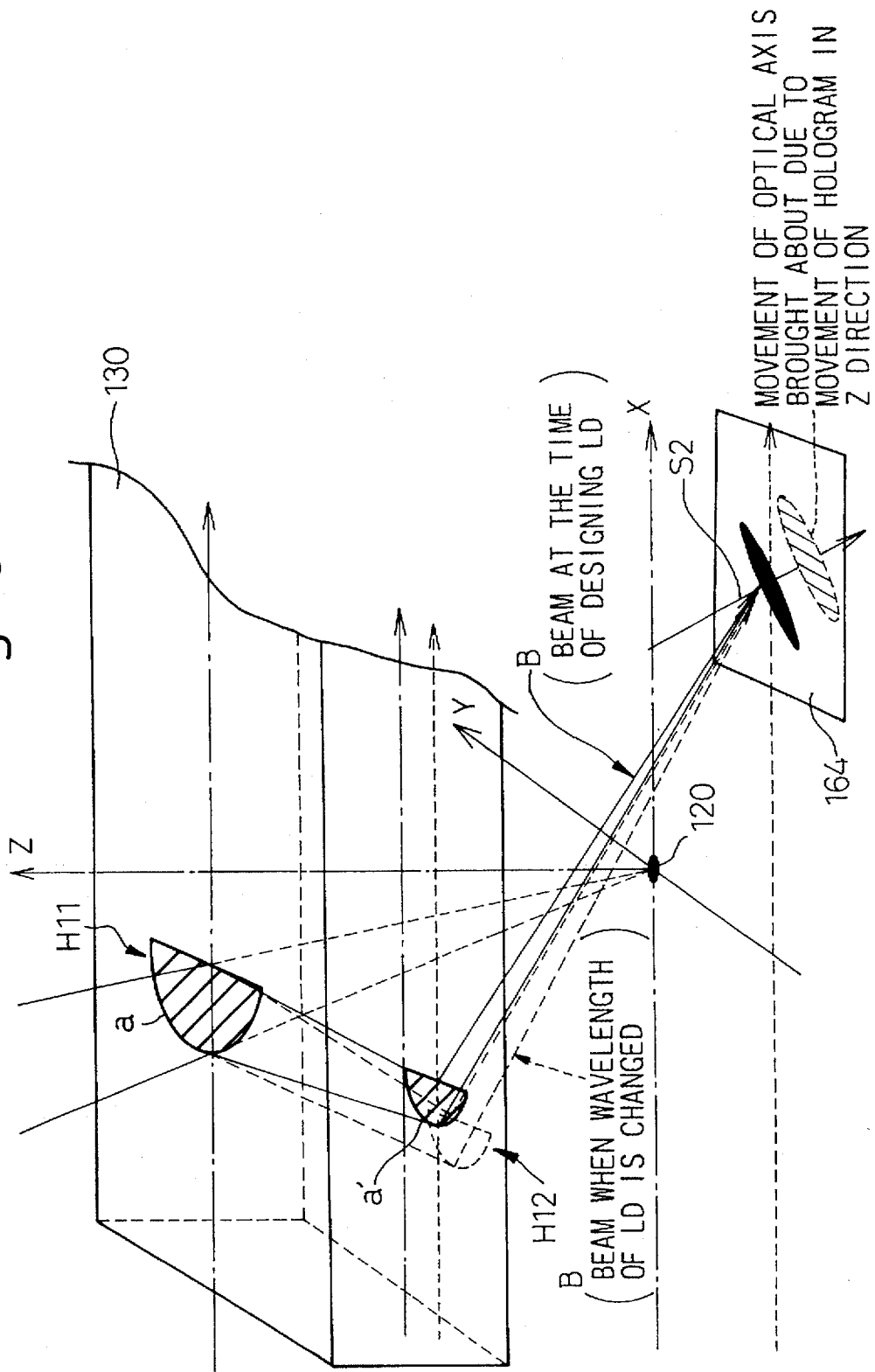

DIRECTION OF
IN-PLANE ROTATION

OPTICAL ELEMENT UTILIZED FOR OPTICAL STORAGE UNIT AND OPTICAL DEVICE INCLUDING THE OPTICAL ELEMENT

BACKGROUND OF THE INVENTION

1. Field of the Invention

This invention relates to an optical element utilized for an optical storage unit including an optical head for writing and reading signals to and from an optical storage medium of the optical storage unit such as a magneto-optical disk apparatus, an optical disk apparatus, etc., and to an optical device including this optical element.

A storage unit including a large capacity storage medium (memory) is required nowadays with the higher performance of computers. Optical storage units using an optical storage medium such as a CD (Compact Disk), a CD-ROM (Compact Disk - Read-Only Memory), a magneto-optical disk, an optical disk, etc., have drawn increasing attention as the storage unit of this kind. These optical storage units are removable, have a large memory capacity but a small size and a light weight, and are very important for putting compact computers such as high performance personal computers into practical application.

2. Description of the Related Art

A magneto-optical disk as a removable, small and light-weight magneto-optical recording medium has drawn special attention in recent years in place of hard disks of magnetic disk apparatuses as a large capacity storage medium required for higher performance of computers.

In this magneto-optical disk, only the portion which is irradiated by a laser beam and whose temperature rises, undergoes magnetic inversion of magnetization and a signal is recorded. When a low power laser beam for reading is irradiated to the magneto-optical disk, the polarization plane of the reflected beam from only the portion at which the signal exists slightly rotates due to the magneto-optical Kerr effect, and the signal recorded on the magneto-optical disk can be read by detecting this rotation. However, a focus error and a tracking error for the magneto-optical recording medium comprising a magneto-optical disk must be detected simultaneously with this signal read operation.

In order to make the problems of the prior art more easily understood, the explanation will be given on the construction of an optical device utilized for an ordinary optical storage unit with reference to FIGS. 1 and 2.

FIG. 1 is a schematic view showing the construction of an optical device utilized for an optical storage unit according to the prior art. Here, a magneto-optical disk apparatus using a magneto-optical recording medium as a kind of an optical storage medium, that is, a magneto-optical disk 100 as an optical storage unit will be explained by way of example.

In the optical device utilized for the conventional magneto-optical disk apparatus shown in FIG. 1, the laser beam for reading the signal which is emitted from a semiconductor laser 51 is converted to parallel beams by a collimator lens 52. After passing through a beam shaping prism 53, these beams pass through a first polarization beam splitter 54, and only the P polarization component of two polarization components (S and P polarization components) travels towards a magneto-optical disk 100 as a magneto-optical recording medium and is converged on the magneto-optical disk 100 by an objective lens 55.

When write data exists on the magneto-optical disk 100, the angle of polarization of the beam of the P polarization component slightly rotates due to the magneto-optical Kerr effect and the S polarization component perpendicular to the P polarization component slightly occurs.

The laser beam containing both P and S polarization components reflected by the magneto-optical disk 100 is incident into a second polarization beam splitter 57 from the first polarization beam splitter 54. When a part of the laser beam passes through a ½ wavelength plate 58, an optical path difference of the ½ wavelength is produced between the P and S polarization components.

This laser beam passes then through a convergent lens 59, and its P and S polarization components are separated by a third polarization beam splitter 60. These polarization components are incident into photoelectric elements 61 and 62 for detecting the signals, respectively, and the existence of the signal (data) on the magneto-optical disk 100 can be detected by calculating the difference of intensity between these two signals.

On the other hand, the laser beam split by the second polarization beam splitter 57 passes through the convergent lens 63 and is split into two beams by the beam splitter 64. These beams are then incident into the photoelectric elements 65 and 66 for detecting the focus error, respectively, so that detection of the focus error and the tracking error can be carried out. Here, reference numeral 67 denotes a knife edge, which compares the beam at a far place with the beam at a near place and detects the focus error by the difference of light intensity between the beams.

In the optical device utilized for the conventional magneto-optical disk described above, an extremely large number of optical components are necessary for detecting the magneto-optical signals recorded on the magneto-optical disk 100 and for detecting the focus error as well as the tracking error, and a large number of process steps are also necessary for the adjustment. Therefore, the optical device involves the problem that the production cost is high, and the reduction of the size and weight of the disk apparatus cannot be accomplished easily.

A lower production cost has become necessary for the optical storage units using the CD, the CD-ROM, the optical disk and other optical storage media besides the magneto-optical disk, and a lower production cost of the optical element for reading the data and its driver, that is, a driving unit including the optical head, has been strongly required in order to accomplish the reduction of the cost of production. To this end, a system capable of reducing the number of components of the head portion, the size and the weight and the number of the adjustment steps is necessary.

To satisfy such a requirement, a system using holograms for a part of the optical element has been examined. Nonetheless, the number of optical components is large as a whole, and the reduction of the cost of production and the size and weight still remains insufficient.

The construction of an optical pick-up containing an optical element including a hologram in a laser diode is described, for example, in a document "Micro-Optics News" (1989, Vol. 7, No. 2, pp. 20–25). FIG. 2 of the accompanying drawings shows a schematic construction of an optical element utilized for this kind of optical storage unit.

In FIG. 2, a hologram 72 is shown, which is formed inside a package of an optical pick-up 82 including a laser diode 70 (which is generally abbreviated "LD") as a semiconductor laser. The laser beam from the laser diode 70 passes through this hologram 72 and is converged to an optical storage element 79 inside an optical storage unit 80 through a collimator lens 76 and an objective lens 78. The laser beam reflected by, and returning from, the optical storage element 79 again passes through the hologram 72 and is incident into a detector such as a photoelectric element 84. This detector 84 detects the focus error and the tracking error.

However, because this hologram 72 is directed merely to detecting the focus error and the tracking error, it does not at all have the functions of separating the polarization components necessary for detecting the magneto-optical signals of the magneto-optical disk, etc. Therefore, the optical pick-up shown in FIG. 2 can be used only for the driver for the CD or CD-ROM.

Another document "The Japanese Society of Applied Physics" (1993 Fall Meeting, pp. 1008, 28a-SF-11) discloses the construction of a module for a magneto-optical disk whose size is made compact by integrating a laser diode into its package. Because a photo-detector using a prism, etc., is necessary for detecting the magneto-optical signals, the number of components is large and adjustment is not so easy.

Still another document "Optics"[Vol. 20, No. 8 (published in August, 1991), pp. 500–506] describes an apparatus including a magneto-optical head which causes a reflected beam from the magneto-optical disk to be incident into a substrate wherein holograms having a single pitch are formed on both surfaces of the substrate.

In the reflected beam from the magneto-optical disk, the S polarization component parallel to the diffraction grating of the hologram is diffracted by the first and second holograms, whereas the P polarization component perpendicular to the diffraction grating passes through both holograms. Therefore, the S and P polarization signals can be separated and detected by disposing two photo-detectors at the back of the substrate. However, the apparatus requires other prisms and lenses, and the number of optical components is not sufficiently reduced.

When one hologram shown in FIG. 2 is applied to the optical device utilized for the optical storage unit, the following problems are likely to occur.

First, wavelength fluctuation due to the ambient temperature of the semiconductor laser and variance of the wavelength depending on the production lot of the semiconductor laser often occur, so that the beam of the laser beam moves on the detector for detecting the signal, or otherwise the focus of the beam deviates. This problem is solved by causing the movement of the beam in the direction of the split line of the detector. The problem of off-focus of the beam is avoided by using a hologram having low image formation performance.

Second, when the diameter of the beam on the detector is excessively contracted, adjustment of the beam on the detector in the direction of focus of the detector and its horizontal direction becomes difficult. Therefore, the beam diameter must be increased. When the diameter of the beam is excessively small, on the other hand, the focal depth becomes small, and positioning of the optical axis on the detector becomes extremely difficult. Alternatively, the production accuracy requirements of the integral detector in the vertical and transverse direction become more severe, and this is contradictory to the lower cost of production of the optical storage unit as a whole.

The beam diameter can be increased by decreasing the aperture, but when the aperture is decreased, another problem arises in that the loss of light intensity is large. Particularly in the case of the magneto-optical disk, it is important not to excessively decrease the aperture so as to prevent the drop of read light intensity which is originally small. On the other hand, the smaller the ratio of the image formation focal length for detecting the focus error to the focal length of the collimator lens (that is, an aspect ratio) is, the easier the axis adjustment becomes. It is therefore necessary to increase the beam diameter by reducing the aperture to a certain extent.

As described above, when the hologram is applied to the optical device utilized for the optical storage unit, an expensive detector having excellent production accuracy in the vertical and transverse directions of the detector must be used, in order to easily correct the position error of the beam on the detector resulting from the wavelength fluctuation due to the ambient temperature of the semiconductor laser and variance of the wavelength depending on the production lot, and to easily conduct positioning of the optical axis on the detector. Further, to avoid the problem of deterioration of beam image formability at the detector, the beam diameter of the laser beam must be adjusted to a suitable size, and a long time and a large number of steps are necessary for the adjustment of the laser beam.

SUMMARY OF THE INVENTION

In view of the problems described above, the present invention aims at providing an optical element utilized for an optical storage unit capable of accomplishing drastic reduction of production cost, size and weight by reducing the number of optical components to a minimum, and an optical device including the optical element.

It is another object of the present invention to provide an optical element for an optical storage unit which does not require severe production accuracy of a detector and enormous time and steps for the adjustment of a beam diameter so as to prevent the position error of a beam on the detector resulting from wavelength fluctuation due to the ambient temperature of a semiconductor laser or variance of the wavelength depending on the production lot when holograms are used for a part of optical components.

To accomplish the objects described above, an optical element utilized for an optical storage unit according to the present invention comprises an optical substrate made of a material allowing the transmission of a laser beam emitted from a semiconductor laser, and disposed between the semiconductor laser and an optical storage unit including an optical storage medium; a first hologram formed on the optical substrate in such a manner as to transmit the laser beam emitted from the semiconductor laser, and to allow it to be incident into the optical storage medium and to diffract the laser beam reflected by the optical storage medium into the optical substrate; and a second hologram formed on the optical substrate in such a manner as to transmit one of the two polarization components contained in the laser beam diffracted by the first hologram and propagating inside the optical substrate, to diffract the other of the polarization components and to thus separate the two polarization components. Further, the optical element according to the present invention is so constituted as to detect a signal representing the state of the optical storage medium by detecting the difference of intensities of the two polarization components separated by the second hologram by signal detection portions.

On the other hand, an optical device utilized for an optical storage unit according to the present invention comprises a semiconductor laser for emitting a laser beam; an optical substrate made of a material allowing the transmission of the laser beam, and disposed between the semiconductor laser and an optical storage unit including an optical storage medium; a first hologram formed on the optical substrate in such a manner as to transmit the laser beam emitted from the semiconductor laser, and to allow it to be incident into the optical storage medium and to diffract the laser beam reflected by the optical storage medium into the optical substrate; and a second hologram formed on the optical substrate in such a manner as to transmit one of the two polarization components contained in the laser beam diffracted by the first hologram and propagating inside the optical substrate, to diffract the other of the polarization components and to thus separate the two polarization components. Further, the optical device according to the present invention is so constituted as to detect a signal representing the state of the optical storage medium by detecting the difference of intensities of the two polarization components separated by the second hologram by signal detection portions.

Preferably, an optical device utilized for an optical storage unit including a magneto-optical recording medium as an optical storage medium comprises a semiconductor laser for emitting a laser beam; an optical substrate made of a material allowing the transmission of the laser beam, and disposed between the semiconductor laser and an optical storage unit including the optical storage medium; a first hologram formed on the optical substrate in such a manner as to transmit the laser beam emitted from the semiconductor laser, and to allow it to be incident into the optical storage medium and to diffract the laser beam reflected by the optical storage medium into the optical substrate; a second hologram formed on the optical substrate in such a manner as to transmit one of the two polarization components contained in the laser beam diffracted by the first hologram and propagating inside the optical substrate, to diffract the other of the polarization components and to thus separate the two polarization components; and a third hologram formed on the optical substrate in such a manner as to diffract the laser beam diffracted by the first hologram and propagating inside the optical substrate into a plurality of mutually different directions different from the direction of diffraction of the other polarization component.

By the way, the first hologram may be formed on the surface of the optical substrate opposing the opto-magnetic recording medium, and the second and third holograms may be formed on the surface of the optical substrate not opposing the magneto-optical recording medium.

Preferably, the first hologram is disposed in such a manner that the direction of grating thereof is at right angles to the direction of linear polarization of the laser beam emitted from the semiconductor laser, and the second hologram is disposed in such a manner that the direction of the grating thereof is optically inclined at 45° (degree) to the direction of the grating of the first hologram.

A slope for totally reflecting the laser beam may be formed on the optical substrate so that the laser beam, which is diffracted by the first hologram, and then propagates inside the optical substrate and is totally reflected inside the optical substrate, is perpendicularly incident into the second hologram.

Preferably, a phase compensation film is formed on the slope so as to compensate for the phases so that no phase difference occurs in the two quadrature polarization components of the laser beam totally reflected inside the optical substrate.

When the spatial frequency of the first or second hologram is f, and the wavelength of the laser beam emitted from the semiconductor laser is $\lambda$, the relation $(f \times \lambda) \geq 1.4$ is preferably satisfied.

The third hologram preferably includes a plurality of hologram patterns for detecting a focus error and a plurality of hologram patterns for detecting a tracking error for the magneto-optical recording medium, and the laser beam diffracted by each hologram pattern is preferably incident into each separate detection means.

In this case, a circular overall shape of the third hologram may be divided into H-shaped hologram patterns, either one group of the hologram patterns for detecting the focus error and the hologram patterns for detecting the tracking error may be formed on the right and left side portions, and the other, on the upper and lower portions between these right and left side portions.

The second hologram may be formed around the third hologram in such a manner as to encompass the third hologram, or the third hologram may be formed at the position of passage of the laser beam diffracted on the opposite side to the laser beam diffracted by the first hologram in such a manner as to travel towards the second hologram.

The optical substrate is preferably assembled in a package of the semiconductor laser.

The optical element utilized for the optical storage unit according to the present invention preferably includes an optical substrate wherein a hologram including a plurality of holograms for detecting a focus error and a plurality of holograms for detecting a tracking error for a magneto-optical recording medium inside an optical storage unit is so formed as to be encompassed by a hologram for writing/reading of the magneto-optical recording medium.

In the optical element of the present invention, the hologram patterns for detecting the focus error and for detecting the tracking error may be divided into H-shaped hologram patterns, one of the hologram patterns may be formed on the right and left side portions and the other, between the upper and lower portions between the right and left side portions.

In a preferred embodiment of the optical device utilized for the optical storage unit according to the present invention, the semiconductor laser is used as the light source, two split detectors for detecting the focus error and two detectors for detecting the tracking error are integrally formed with one another by using the first and second holograms, and the first and second holograms for converting the wave front of the laser beam emitted from a bare chip of the semiconductor laser are formed on the face and back of a substrate constituting the optical substrate, respectively.

Further, preferably, the light source of the semiconductor laser, two split detectors for detecting the focus error, and two detectors for detecting the tracking error are formed on the same base substrate, which is disposed in the base of the optical device.

Further, preferably, the above two split detectors and the above two detectors are arranged in the position which is deviated from an optical axis of the laser beam of the semiconductor laser.

Further, preferably, an optical substrate, which serves as an optical element utilized for the optical storage unit, is mounted on the base substrate.

The first hologram positioned on the surface of the semiconductor laser opposite to the surface on the bare chip side comprises four hologram patterns, the second hologram positioned on the bare chip side of the semiconductor laser comprises two hologram patterns, the hologram patterns of the first hologram and the hologram patterns of the second hologram are formed at spatially different positions with one another, and the laser beam from the semiconductor laser passes through the first hologram, is then incident into the optical storage medium, and returns as a read beam to the first hologram.

To detect the focus error, in this case, the first read beam propagating from one of the hologram patterns of the first hologram to one of the hologram patterns of the second hologram and diffracted there, and the second read beam propagating from another hologram pattern of the first hologram pattern to the other hologram pattern of the second hologram and diffracted there, are guided to the split detectors for detecting the focus error, and the third read beam propagating from still another hologram pattern of the first hologram and the fourth read beam diffracted by still another hologram pattern of the first hologram are guided to the detectors for tracking error in order to detect the tracking error.

In the preferred embodiment of the optical device utilized for the optical storage unit according to the present invention, further, the hologram patterns of the first hologram and the hologram patterns of the second hologram correct the longitudinal and transverse aberrations on the split detectors for detecting the focus error, resulting from the wavelength fluctuation of the semiconductor laser or variance of the wavelength when the first read beam and the second read beam are diffracted by the hologram patterns of the first hologram and the hologram patterns of the second hologram, and the size of the luminous flux of the laser beam incident into the hologram patterns of the first hologram is reduced when it passes through the hologram patterns of the second hologram.

In the preferred embodiment of the optical device utilized for the optical storage unit according to the present invention, further, the hologram patterns of the second hologram are formed at the positions into which the laser beam from the semiconductor laser is not incident, and the laser beam is allowed to be incident into only the hologram patterns of the first hologram.

In the preferred embodiment of the optical device utilized for the optical storage unit according to the present invention, further, the hologram patterns of the second hologram, the split detectors for detecting the focus error, corresponding to these hologram patterns, respectively, and the hologram patterns of the first hologram on the opposite surface of the semiconductor laser to the bare chip side of the semiconductor laser are formed at positions substantially symmetric with one another, respectively, with respect to a line crossing orthogonally the line connecting one of the hologram patterns to another hologram pattern of the first hologram.

In the preferred embodiment of the optical device utilized for the optical storage unit according to the present invention, further, the direction of the split line of the split detectors for detecting the focus error is inclined with respect to the movement of the first and second holograms in the direction of the optical axes and in the in-plane direction so that the change of light intensity incident into the split detectors becomes small.

In the preferred embodiment of the optical device utilized for the optical storage unit according to the present invention, the positions of the hologram patterns of the second hologram and the positions of the split detectors for detecting the focus error, corresponding to these hologram patterns, respectively, are set to be substantially point-symmetric with the semiconductor laser being the spot center, so that the change of the beam shapes of the laser beams incident to the split detectors becomes equal with respect to the adjustment of the in-plane rotation of the first and second holograms.

In still another preferred embodiment of the optical device utilized for the optical storage unit according to the present invention, the semiconductor laser is used as the light source, and the two split detectors for detecting the focus error are formed integrally with each other by using the first and second holograms, and the first and second holograms for converting the front wave of the laser beam emitted from the bare chip of the semiconductor laser are formed on the face and back of the substrate that constitutes the optical substrate.

The laser beam from the semiconductor laser passes through the first hologram, is then incident into the optical storage medium and returns as the read beam to the first hologram. The read beam propagating from the first hologram to the second hologram and diffracted is guided to the split detectors for detecting the focus error.

In this case, the interference fringes of the first hologram are formed so as to gradually become dense (or close) from the coarse (or thin) center portion towards the dense outer portion, and the interference fringes of the second hologram are formed so as to gradually become coarse from the dense center portion towards the coarse outer portion, or otherwise the interference fringes of the first hologram are formed so as to gradually become coarse from the dense center portion towards the coarse outer portion, and the interference fringes of the second hologram are formed so as to gradually become dense from the coarse center portion towards the dense outer portion, and each component of the interference fringes of each of the first and second holograms is only a unidirectional component.

In still another preferred embodiment of the optical device utilized for the optical storage unit according to the present invention, when the wavelength of the laser beam from the semiconductor laser is $\lambda$, the phase transmission functions of the first and second holograms are expressed by the following formulas, respectively:

$$\phi(x,\ y)=(2\pi/\lambda)\ (g1\cdot x+g2\cdot x^2)$$

$$\phi(x,\ y)=(2\pi/\lambda)\ (h1\cdot x+h2\cdot x^2)$$

In this case, each phase transmission function comprises an off-axis component of only a unidirectional component and a parabolic phase.

In still another preferred embodiment of the optical device utilized for the optical storage unit according to the present invention, the interference fringes themselves of the first and second holograms having the phase transmission functions are rotated integrally with the first and second holograms so as to deviate the positions of the two laser beams forming the images on the two split detectors for detecting the focus error to a direction orthogonally crossing the line connecting these two laser beams and to avoid the construction in which the semiconductor laser and the split detectors are aligned on the same straight line.

In the optical element utilized for the optical storage unit and the optical device according to the present invention, the laser beam emitted from the semiconductor laser passes through the first hologram and strikes the optical storage medium such as the magneto-optical recording medium, and the laser beam reflected by this optical storage medium is diffracted by the first hologram and propagates inside the optical substrate.

Further, one of the polarization components of the laser beam reaching the second hologram passes through the second hologram, while the other component is diffracted, so that both polarization components are separated. Accordingly, the signal of the optical storage medium can be easily detected by detecting the intensities of both polarization components by the detectors, etc., and calculating their difference.

In other words, in the present invention, two (or a pair of) holograms are formed on the upper and lower surfaces of the optical substrate such as a substrate and this optical substrate is assembled into the package of the semiconductor laser. In this way, the present invention can produce an economical, light-weight optical device utilized for an optical storage unit. Two polarization components (that is, P and S polarization components, for example) necessary for detecting the signal representing the state of the optical storage medium are accurately separated from the laser beam incident into and returning from the optical storage medium such as the CD, the CD-ROM, the magneto-optical disk, the optical disk, etc., by the combination of the two holograms, and these polarization components are then guided to the detectors such as photoelectric elements. In this way, the signal from the optical storage medium can be detected easily.

When the third hologram is formed on the optical substrate in addition to the first and second holograms, the laser beam reaching this third hologram is diffracted in a plurality of mutually different directions. The focus error as well as the tracking error can be detected by detecting the intensity of each of these laser beams.

When the direction of the grating of the first hologram is set at right angles to the direction of linear polarization of the laser beam emitted from the semiconductor laser, the laser beam incident into the first hologram has only the P polarization component.

When the direction of the grating of the second hologram is inclined optically at 45° to the direction of the grating of the first hologram, the difference of intensity between the S polarization component and the P polarization component contained in the reflected beam contained in the optical storage medium such as the magneto-optical recording medium can be detected after magnification.

In the third hologram, the laser beams diffracted by a plurality of hologram patterns for detecting the focus error and a plurality of hologram patterns for detecting the tracking error for the magneto-optical recording medium are incident into separate detection means, and the focus error and the tracking error can be detected from the detection outputs from these detection means.

An extremely compact and light-weight optical device can be constituted by assembling the optical element including the optical substrate described above into the package of the semiconductor laser so as to integrate the optical substrate with the semiconductor laser.

In still another preferred embodiment of the optical device according to the present invention, the laser beam from the semiconductor laser is allowed to be incident into only the hologram patterns of the first hologram. Therefore, the second hologram which emits the signal of the read beam returning from the optical storage medium to the split detectors is not directly affected by the influences of the wavelength fluctuation of the semiconductor laser, etc., so that the position error of the beam and the deviation of the beam focus on the split detectors can be markedly reduced.

In still another preferred embodiment of the optical device according to the present invention, the two hologram patterns of the second hologram are formed at substantially symmetric positions with respect to a line orthogonally crossing the line connecting two hologram patterns in the first hologram. Therefore, positioning on the optical axis on the detector becomes easier.

In still another preferred embodiment of the optical device according to the present invention, the direction of the split line of the split detectors for detecting the focus error is inclined so that the change of the read beam incident into the split detectors becomes small with respect to the movement of the first and second holograms in the direction of the optical axes and in the in-plane direction. Therefore, signal detection from the optical storage medium can be stably carried out.

In still another preferred embodiment of the present invention, the positions of the second hologram patterns are set to be substantially point-symmetric with one another with the semiconductor laser being the point center. Therefore, the change of the beam shapes of the laser beams incident into the split detectors can be made equal to each other with respect to the adjustment of the in-plane rotation of the first and second holograms, and deviation of the beam focus resulting from the wavelength fluctuation of the semiconductor laser, etc., can be drastically reduced.

In still another preferred embodiment of the present invention, the semiconductor laser is used as the light source, and the optical substrate provided with the first and second holograms for converting the wave front of the laser beam emitted from the semiconductor laser, such as a substrate, and two split detectors for detecting the focus error are formed integrally with one another. Therefore, the present invention can produce a small and light-weight optical device which can be applied to various optical storage units such as the CD, the optical disk, and so forth.

In still another preferred embodiment of the present invention, the interference fringes of the first hologram are formed in such a manner as to gradually become dense from the coarse center portion towards the dense outer portion, while the interference fringes of the second hologram are formed in such a manner as to gradually become coarse from the dense center portion towards the coarse outer portion, or otherwise the interference fringes of the first hologram are formed in such a manner as to gradually become coarse from the dense center portion towards the coarse outer portion, while the interference fringes of the second hologram are formed in such a manner as to gradually become dense from the coarse center portion towards the dense outer portion, and each component of the interference fringes of these first and second holograms is only the unidirectional component. Therefore, deterioration of image formability of the laser beams resulting from the wavelength fluctuation of the semiconductor laser or the disposition error of the optical substrate having the holograms formed thereon can be easily avoided. As a result, the margin of the production of the holograms becomes larger, and the production margin of the overall optical system becomes larger, as well.

In still another preferred embodiment of the present invention, the phase transmission functions of the first and second holograms of the optical device comprise the off-axis $[\phi(x, y)=kx]$ of only the unidirectional component and the parabolic phase $[\phi(x, y) =kx^2]$, and the phase transmission functions of the two hologram offset each other. Therefore, even when the wavelength of the semiconductor laser fluctuates, the image formation positions of the beams of the return paths of the laser beams hardly deviate, and collapse of the beam diameter which adversely affects the detection of the focus error does not occur.

On the other hand, the problem generally occurs in optical devices utilized for optical storage units in that it is technically difficult to mount the semiconductor laser for emitting the laser beam and the detectors for receiving the laser beam to the same position. In still another preferred embodiment of the present invention, however, the interference fringes themselves of the first and second holograms having the phase transmission functions described above are rotated integrally with these first and second holograms, and the positions of the two laser beams, which form the image on the split detectors for detecting the focus error, are deviated in a direction crossing orthogonally the line connecting these two laser beams (for example, in the Y direction) lest the semiconductor laser and the split detectors are aligned on the same straight line, so as to avoid the problem described above.

BRIEF DESCRIPTION OF THE DRAWINGS

The above object and features of the present invention will be more apparent from the following description of the preferred embodiments with reference to the accompanying drawings, wherein:

FIG. 16 is a perspective view showing in magnification the hologram portion for the focus servo in the embodiment shown in FIG. 14;

DESCRIPTION OF THE PREFERRED EMBODIMENTS

Hereinafter, preferred embodiments of the present invention will be explained in detail with reference to the accompanying drawings (FIGS. 3 to 24).

Figure 1:
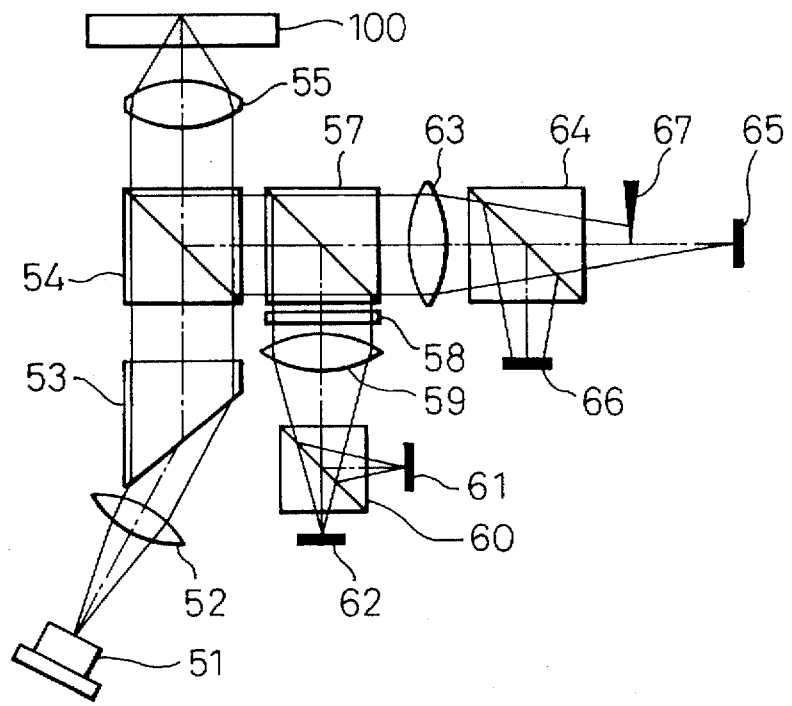
FIG. 1 is a schematic view showing the construction of an optical device for an optical storage unit according to the prior art.
Figure 2:
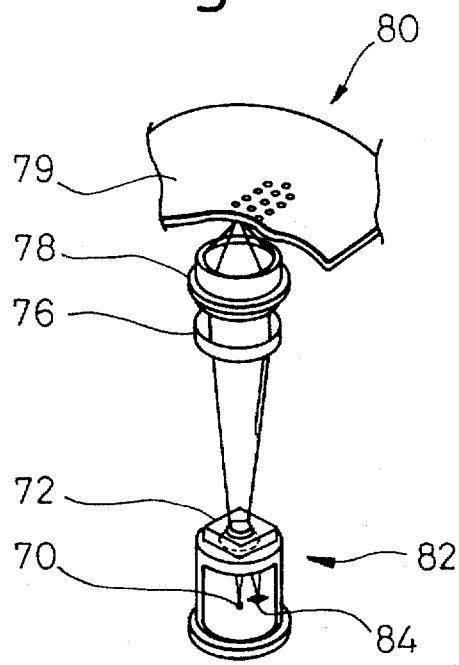
FIG. 2 is a perspective view showing the construction of an optical element for an optical storage unit using a conventional hologram.
Figure 3:
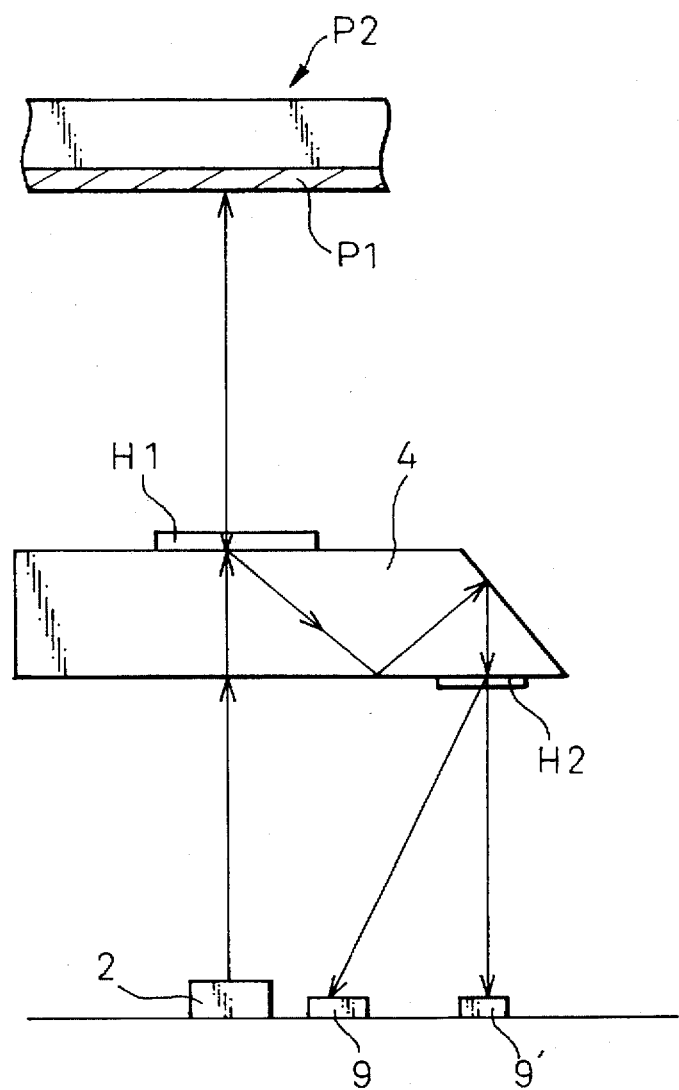
FIG. 3 is a schematic view showing the construction of a basic embodiment based on the principle of the present invention.

FIG. 3 is a schematic view showing the construction of a basic embodiment based on the principle of the present invention. The drawing shows in a simplified form the principal portions of an optical device for an optical storage unit associated with the present invention.

As shown in FIG. 3, an optical element for an optical storage unit according to the basic embodiment of the present invention includes an optical substrate 4 made of a material which allows the transmission of a laser beam emitted from a semiconductor laser 2 and interposed between this semiconductor laser 2 and an optical storage unit P2 inclusive of an optical storage medium P1; a first hologram H1 formed on the optical substrate 4 in such a manner as to transmit the laser beam emitted from the semiconductor laser 2, to cause the laser beam to be incident into the optical storage medium P1 and to diffract the laser beam reflected by the optical storage medium P1 into the optical substrate 4; and the second hologram H2 formed on the optical substrate 4 in such a manner as to transmit one of the two polarization components contained in the laser beam diffracted by the first hologram H1 and propagating inside the optical substrate 4, to diffract the other polarization component and thus to separate the two polarization components from each other. Further, the optical element according to the present invention is so constituted as to detect the difference of intensity of the two polarization components separated by the second hologram H2 by signal detection portions 9, 9' and to detect a signal representing the state of the optical storage medium P1 described above.

On the other hand, an optical device for an optical storage unit according to the basic embodiment of the present invention includes, as shown in FIG. 3, the semiconductor laser 2 for emitting the laser beam, the optical substrate 4 made of a material allowing the transmission of the laser beam and interposed between the semiconductor laser 2 and the optical storage unit P2 inclusive of the optical storage medium P1; the first hologram H1 so formed on the optical substrate 4 as to transmit the laser beam emitted from the optical storage medium P1 and to diffract the laser beam into the optical substrate 4; and the second hologram H2 so formed on the optical substrate 4 as to transmit one of the two polarization components of the laser beam, which are diffracted by the first hologram H1 and propagate inside the optical substrate 4, to diffract the other polarization component and thus to separate the two polarization components from each other. Further, the optical device according to the present invention is so constituted as to detect the difference of intensity of the two polarization components separated by the second hologram H2 by the signal detection portions 9, 9' and to detect a signal representing the state of the optical storage medium P1.

Preferably, the optical device for an optical storage unit inclusive of a magneto-optical recording medium as the optical storage medium P1 described above includes the semiconductor laser 2 for emitting the laser beam; the optical substrate 4 made of a material allowing the transmission of the laser beam and interposed between the semiconductor laser 2 and the magneto-optical recording medium inside the optical storage unit; the first hologram H1 formed on the optical substrate 4 in such a manner as to transmit the laser beam emitted from the semiconductor laser 2, to cause the laser beam to be incident into the magneto-optical recording medium and to diffract the laser beam reflected by the magneto-optical recording medium into the optical substrate 4; the second hologram H2 formed on the optical substrate 4 in such a manner as to transmit one of the two polarization components of the laser beam, which is diffracted by the first hologram and propagates inside the optical substrate, to diffract the other polarization component and thus to separate the two polarization components from each other; and a third hologram formed on the optical substrate 4 in such a manner as to diffract the laser beam diffracted by the first hologram H1 and propagating inside the optical substrate 4 into a plurality of mutually different directions which are different from the diffracting direction of the other polarization component described above.

By the way, the first hologram H1 may be formed on the surface of the optical substrate 4 opposing the magneto-optical recording medium P1, whereas the second and third holograms may be formed on the surface of the optical substrate 4 not opposing the magneto-optical recording medium P1.

The first hologram H1 is disposed in such a manner that the grating direction thereof is orthogonal to the direction of linear polarization of the laser beam emitted from the semiconductor laser 2, and the second hologram H2 is preferably disposed in such a manner that the grating direction thereof is optically inclined at 45° to the grating direction of the first hologram H1.

Further, a slope surface may be formed on the optical substrate 4 so that the laser beam, which is diffracted by the first hologram H1, then propagates inside the optical substrate 4 and is thereafter reflected totally inside the optical substrate 4, can be totally reflected and can be caused to be incident perpendicularly into the second hologram H2.

It is advisable in this instance to form a phase compensation film on the slope for compensating the phases lest a phase difference occurs between the two polarization components of the laser beam totally reflected inside the optical substrate 4 and orthogonally crossing each other.

Preferably, the relation $(f \times \lambda) \geq 1.4$ is satisfied, when the spatial frequency of the first or second hologram H1 or H2 is f and the wavelength of the laser beam emitted from the semiconductor laser 2 is $\lambda$.

The third hologram preferably includes a plurality of hologram patterns for detecting a focus error for the magneto-optical recording medium and a plurality of hologram patterns for detecting a tracking error, and the laser beam diffracted from each hologram pattern is preferably incident into separate detection means.

In this case, in the third hologram described above, a circular overall shape is divided by an H-shaped form into hologram patterns, one of the hologram patterns for detecting the focus error and the tracking error is formed on the right and left side portions, and the other hologram pattern is formed at the upper and lower portions between the former.

By the way, the second hologram H2 may be so formed around the third hologram as to encompass the latter, or the third hologram may be formed at the passing position of the laser beam diffracted on the opposite side to the laser beam which is diffracted by the first hologram H1 as to travel towards the second hologram H2.

The optical substrate 4 is preferably assembled in the package of the semiconductor laser 2.

Preferably, the optical element for the optical storage unit according to the basic embodiment of the present invention shown in FIG. 3 has the optical substrate 4 in which the hologram having a plurality of hologram patterns for detecting the focus error to the magneto-optical recording medium inside the optical storage unit and a plurality of hologram patterns for detecting the tracking error is so formed as to be encompassed by the hologram for writing/reading of the magneto-optical recording medium.

In the optical element described above, the hologram patterns for detecting the focus error and the hologram patterns for detecting the tracking error may be divided by an H-shaped form into hologram patterns, one of the hologram patterns may be formed on the right and left side portions, and the other hologram patterns may be formed on the upper and lower portions between the right and left side portions.

In the optical element for the optical storage unit and the optical device according to the basic embodiment of the present invention shown in FIG. 3, the laser beam emitted from the semiconductor laser 2 passes through the first hologram H1, and impinges against the optical recording medium P1, and the laser beam reflected by this optical recording medium P1 is diffracted by the first hologram H1 and propagates inside the optical substrate 4.

Further, one of the polarization components of the laser beam reaching the second hologram H2 passes through the second hologram H2 and the other polarization component is diffracted there, so that both polarization components are separated from each other. Therefore, when the intensities of both polarization components are detected and their difference is calculated by the signal detection portions 9, 9' such as sensors, the signal of the optical storage medium P1 can be easily detected.

In other words, in the present invention, two holograms (such as the first and second holograms H1, H2) are formed on the upper and lower surfaces of the optical substrate 4 such as a substrate, and an optical device for the optical storage unit, which is economical and is small in size and light in weight, can be produced by assembling this optical substrate 4 into the package of the semiconductor laser 2. P and S polarization components necessary for detecting the signal representing the state of the optical storage medium can be accurately separated from the laser beam which is incident into, and returns from, the optical storage medium such as a CD, a CD-ROM, an magneto-optical disk and an optical disk by the combination of the two holograms described above, and these P and S polarization components are then guided to each detector such as the photoelectric component. In this way, the signal from the optical storage medium P1 can be easily detected.

When the third hologram is formed on the optical substrate 4 in addition to the first and second holograms H1, H2, the laser beam reaching this third hologram is diffracted in a plurality of mutually different directions. When the intensity of each of these laser beams is detected, the focus error and the tracking error can be detected.

When the direction of grating of the first hologram H1 is set at right angles to the direction of linear polarization of the laser beam emitted from the semiconductor laser 2, the laser beam incident into the first hologram H1 is only the P polarization component.

When the direction of grating of the second hologram H2 is inclined optically at 45° to the direction of grating of the first hologram H1, it becomes possible to enlarge and detect the intensity difference between the S polarization component and the P polarization component contained in the reflected beam from the optical storage medium P1 such as the magneto-optical recording medium.

It is possible to cause the laser beam to be perpendicularly incident into the second hologram H2 and to conduct accurate signal detection by reflecting the laser beam, which is diffracted by the first hologram H1, then propagates inside the optical substrate 4 and is thereafter reflected totally inside the optical substrate 4, by the slope formed on the optical substrate 4. When the phase compensation film is formed on this slope, it becomes possible to prevent the occurrence of the phase difference between the two polarization components, which orthogonally cross each other, of the laser beam totally reflected inside the optical substrate 4.

When the wavelength of the laser beam emitted from the semiconductor laser 2 is λ and the spatial frequency of the grating of the first or second hologram H1 or H2 is f, separability of the two orthogonally crossing polarization components of the laser beam can be improved by setting the product (f×λ) to at least 1.4, and the two polarization components can be emitted with a sufficient intensity from the second hologram H2.

At the third hologram, the laser beams diffracted by a plurality of hologram patterns for detecting the focus error to the magneto-optical recording medium, etc., and by a plurality of hologram patterns for detecting the tracking error, are separately incident into separate detection means, and the focus error and the tracking error can be detected from their detection outputs.

Such an optical substrate 4 is assembled into the package of the semiconductor laser 2, and the optical substrate 4 and the semiconductor laser 2 are integrated into a unitary unit into an extremely small and light-weight construction.

According to a preferred embodiment of the optical device for the optical storage unit shown in FIG. 3, a small and light-weight optical device can be produced by using the semiconductor laser as the light source and integrally forming the optical substrate, e.g., substrate which is equipped with the first and second holograms for converting the wave front of the laser beam emitted from the semiconductor laser, two split detectors for detecting the focus error and two detectors for detecting the tracking error, with one another.

According to the preferred embodiment of the optical device shown in FIG. 3, further, wavelength fluctuation due to the temperature change of the semiconductor laser, or longitudinal and transverse aberrations on the split detectors for detecting the focus error due to variance of the wavelengths depending on the production lot of the semiconductor lasers, can be accurately corrected by optimizing the phase transmission functions of the first and second holograms under the condition where the aperture of the second hologram is smaller than that of the first hologram.

According to the preferred embodiment of the optical device shown in FIG. 3, further, the laser beam from the semiconductor laser is allowed to be incident into only the hologram pattern of the first hologram. Therefore, the second hologram, which emits the signal of the read beam returning back from the optical storage medium to the split detectors, is not directly affected by wavelength fluctuation of the semiconductor laser, etc., and for this reason, the position error of the beam and the beam focus error on the split detector can be reduced to a minimum.

Figure 4:
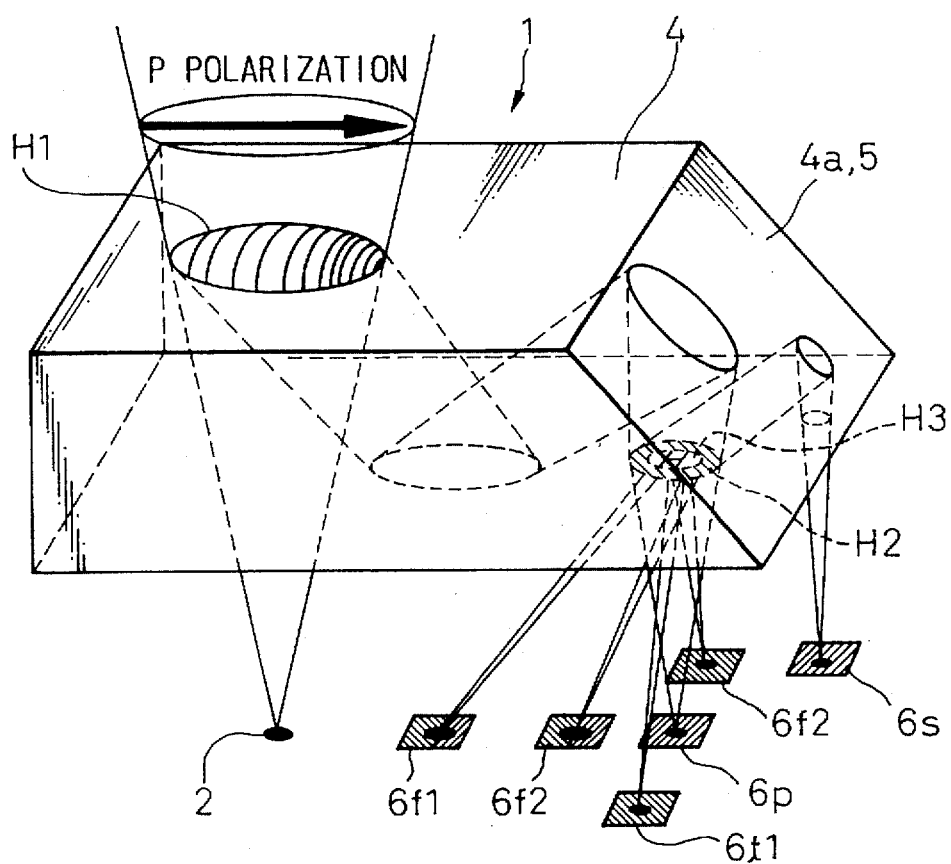
FIG. 4 is a perspective view showing the principal portions of an optical device for an optical storage unit according to the first preferred embodiment of the present invention.
Figure 5:
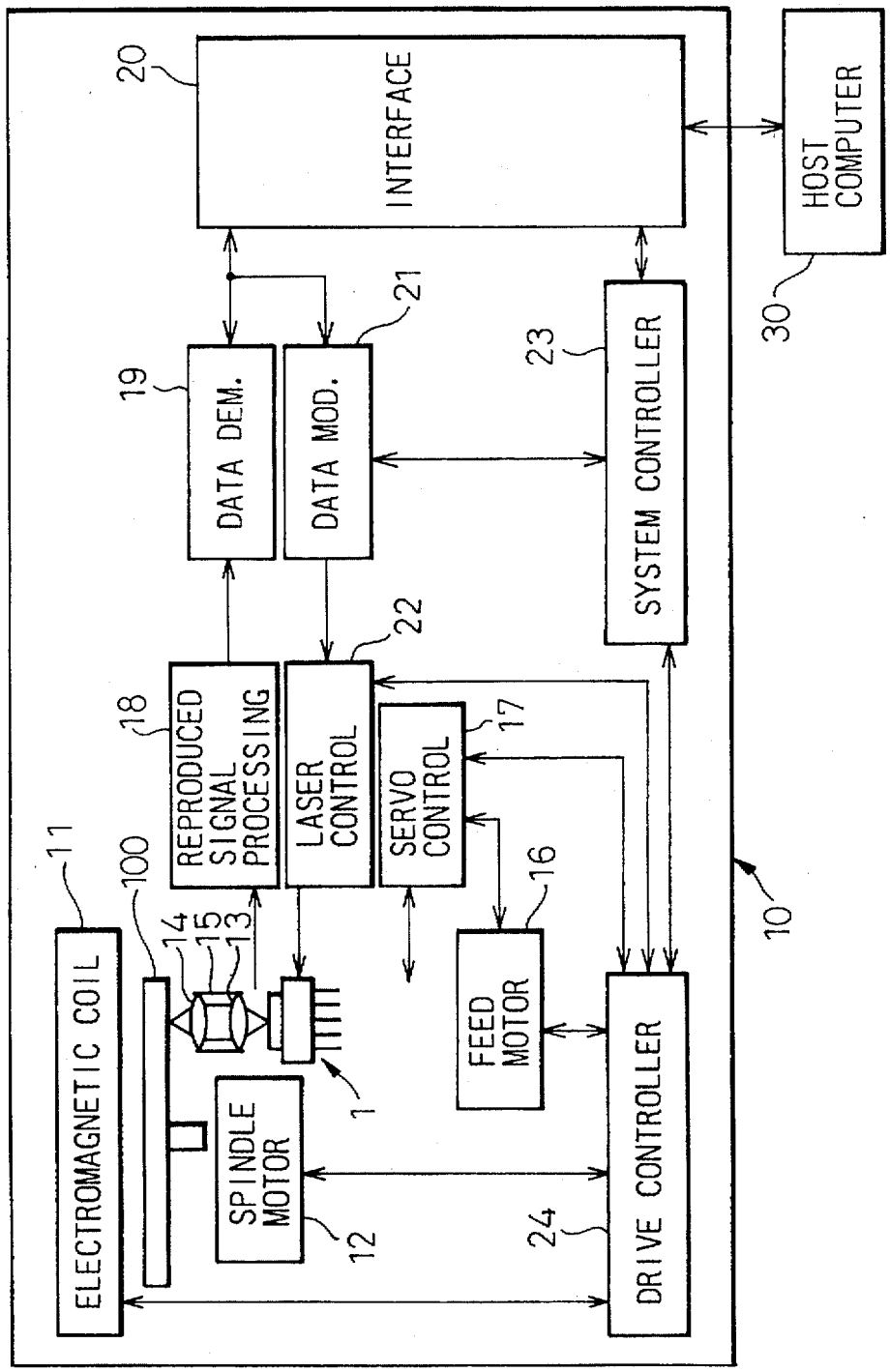
FIG. 5 is a block diagram showing the overall construction of a magneto-optical disk apparatus according to the first preferred embodiment of the present invention.
Figure 6:
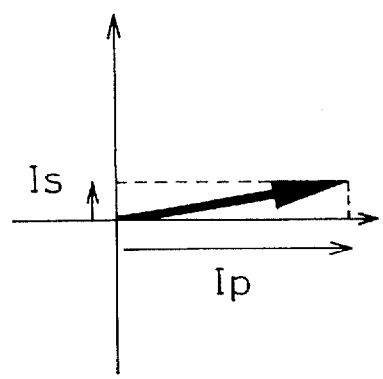
FIG. 6 is a diagram useful for explaining the magneto-optical Kerr effect in the first preferred embodiment of the present invention.

FIG. 4 is a perspective view showing the principal portions of the optical device for the optical storage unit according to the first preferred embodiment of the present invention; FIG. 5 is a block diagram showing the overall construction of the magneto-optical disk apparatus according to the first preferred embodiment of the present invention; and FIG. 6 is a diagram useful for explaining the magneto-optical Kerr effect in the first preferred embodiment of the present invention. However, these drawings represent the case where the optical device according to the present invention is applied to the magneto-optical disk apparatus including the magneto-optical disk as the optical storage unit by way of example. Hereinafter, like reference numerals will be used to represent like constituent members that have been already explained.

FIG. 5 shows a magneto-optical disk apparatus 10 for executing write and read from and to an magneto-optical disk 100 by using a binary signal. The magneto-optical disk 100 is driven for rotation by a spindle motor 12 while opposing a solenoid coil (i.e., electromagnetic coil) 11 for generating an external magnetic field.

Reference numeral 1 denotes a signal detection unit which is integrally assembled into the package of the semiconductor laser for emitting the laser beam. This signal detection unit 1 will be explained later in further detail.

The laser beam emitted from the signal detection unit 1 is only the P polarization component. After being converted to a parallel beam by a collimator lens 13, the P polarization component is converged to the surface of the magneto-optical disk 100 by an objective lens 14 and is reflected there.

When the P polarization component of the laser beam is reflected by the portion where the signal is recorded on the magneto-optical disk 100, the polarization plane slightly rotates due to the magneto-optical Kerr effect as shown in FIG. 6, and the S polarization component which is perpendicular to the P polarization component is contained in the reflected beam.

Turning back to FIG. 5, a lens frame 15 for supporting the collimator lens 13 and the objective lens 14 and the signal detection unit 1 are interconnected in such a manner as to move integrally with each other and to constitute an optical head, and the position of this optical head is controlled by a feed motor 16 comprising a linear motor and is controlled further minutely by a voice coil motor not shown in the drawing. Reference numeral 17 denotes a servo control circuit for controlling the voice coil motor.

The signal, recorded as the magneto-optical signal on the magneto-optical disk 100 is read by the signal detection unit 1, is sent as an electrical signal to a reproduced signal processing circuit 18, and is subjected to signal processing. Thereafter, a data demodulation circuit (data dem.) 19 demodulates the signal to data.

The data so demodulated is sent to a host computer 30 through an interface 20. Reference numerals 21 and 22 denote a data modulation circuit (data mod.) and a laser control circuit that are utilized when the data is written into the magneto-optical disk 100, respectively. The data modulation circuit 21 is controlled by a system controller 23 disposed inside the unit.

A drive controller 24, which is under the control of the system controller 23, controls the driving conditions of the feed motor 16, the servo control circuit 17 and the laser control circuit 22 in addition to the solenoid coil 11 for generating the external magnetic field and the spindle motor 12 for driving and rotating the magneto-optical disk 100.

Figure 7:
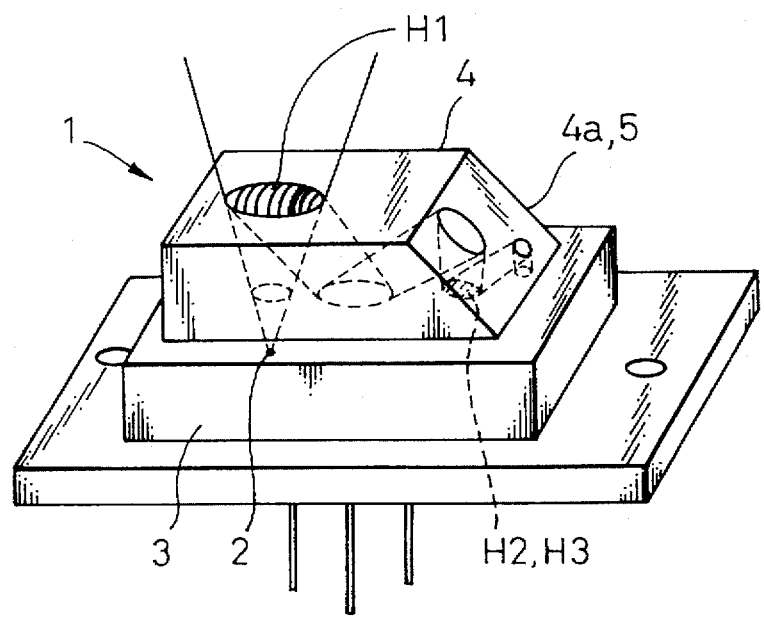
FIG. 7 is a perspective view showing the principal portions of the first preferred embodiment of the present invention.
Figure 8:
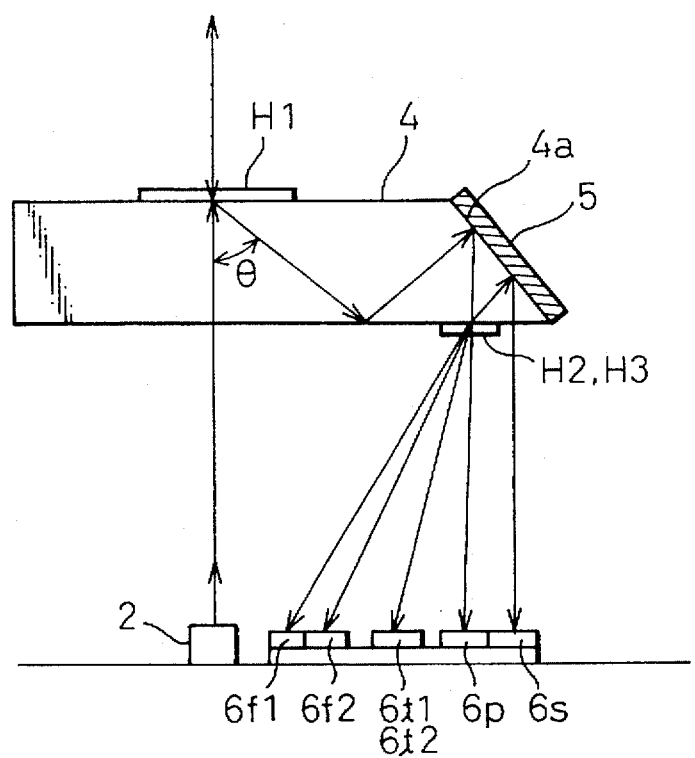
FIG. 8 is a side view showing the principal portions of the first preferred embodiment of the present invention.

FIG. 7 is a perspective view showing the principal portions of the first preferred embodiment of the present invention; and FIG. 8 is a side view showing the principal portions of the first preferred embodiment of the invention. As shown in FIG. 7, in the signal detection unit 1 constituting the principal portions of the first preferred embodiment of the present invention, the optical substrate 4, having formed thereon the first hologram H1, the second hologram H2 and the third hologram H3, is integrally formed in the package 3 which accommodates a bare chip 2 (which is generally called merely the "semiconductor laser 2") of the semiconductor laser for emitting the laser beam having a predetermined wavelength within a near-infrared range, for example.

A plurality of photoelectric elements for detecting signals beams and converting them to electrical signals are accommodated in the package 3. Because these photoelectric elements are not shown in FIG. 7, explanation will be made with reference also to FIGS. 4 and 8 showing the state where the package 3 is removed. Incidentally, only the center beam is shown as the laser beam in FIG. 8. In FIG. 7, it should be noted that the semiconductor laser 2 and the photoelectric elements are formed on the same base substrate, which is disposed in the base of the signal detecting unit 1.

The optical substrate 4 is made of an optical material allowing the transmission of the laser beam emitted from the semiconductor laser 2 and is shaped into a sheet shape having flat parallel surfaces. Hereinafter, the surface of the optical substrate 4 opposing the semiconductor laser 2 will be referred to as the "lower surface" and the surface opposing the magneto-optical disk 100, as the "upper surface".

The laser beam emitted from the semiconductor laser 2 is incident into the optical substrate 4 while dispersing in such a manner that its optical axis is perpendicular to the lower surface of the optical substrate 4 and reaches the first hologram H1 formed on the upper surface of the optical substrate 4.

The first hologram H1 is shaped in such a manner that the direction of grating thereof orthogonally crosses the direction of linear polarization of the laser beam emitted from the semiconductor laser 2. Accordingly, the laser beam incident into the first hologram H1 from the semiconductor laser 2 is only the P polarization component as shown in FIG. 4.

The spatial frequency of the grating of the first hologram H1 is set so that diffraction efficiency in P polarization becomes low.

Figure 9:
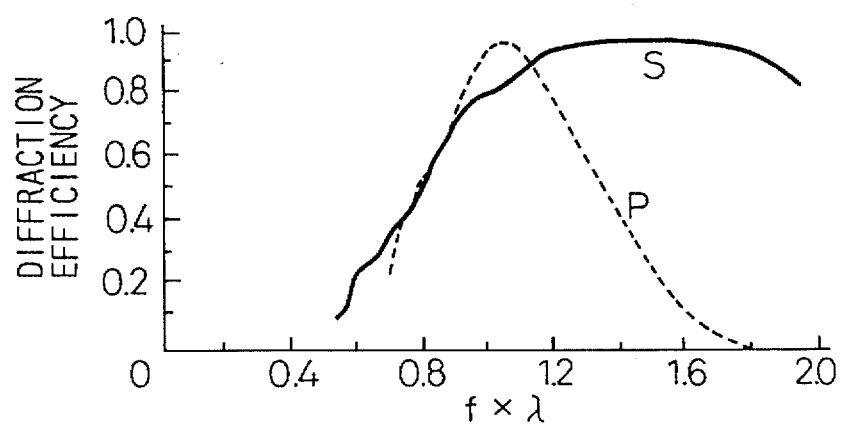
FIG. 9 is a diagram showing diffraction efficiency characteristics of a hologram.

In other words, when the spatial frequency of the grating of the hologram is f and the wavelength of the laser beam is $\lambda$, the greater the value (f×$\lambda$), the greater becomes the difference of diffraction efficiency (polarization separability) between P polarization and S polarization, and remarkable polarization separability occurs when the value (f×$\lambda$) is greater than the value of approximately 1.4 to 1.6, as represented in the diagram of the diffraction efficiency characteristics of the hologram in FIG. 9. When the state of art at present is taken into consideration, however, it is believed that, in practice, (f×$\lambda$) cannot exceed 3.

Here, the first hologram H1 is produced so that it has low diffraction efficiency of the primary diffraction beam of 30% and of the 0-order (zero-order) transmission beam of 70% for P polarization, for example, by setting f1, which is the spatial frequency of the grating, to the optimum spatial frequency at which (f1×$\lambda$) is at least 1.4 and by optimizing its depth and shape. The spatial frequency f1 is about 2,000 pcs(pieces)/mm, for example.

According to the arrangement described above, the intensity of the 0-order transmission beam of the laser beam incident from the semiconductor laser 2 into the first hologram H1 and passing through the first hologram H1 can be secured sufficiently, and is allowed to be incident into the magneto-optical disk 100.

Since the polarization plane rotates somewhat as described already, the reflected beam from the signal portion of the magneto-optical disk 100 contains the S polarization component, is incident from above into the first hologram H1 and diffracts. At this time, the diffraction efficiency of the P polarization component is 30%, and as to S polarization, a primary diffraction efficiency of about 100% can be obtained.

The angle of rotation of the polarization plane due to the Kerr effect can be apparently increased by making the diffraction efficiency of the S component of the signal beam from the magneto-optical disk 100 greater than diffraction efficiency of the P component.

The laser beam diffracted from the first hologram H1 into the optical substrate 4 travels inside the optical substrate 4 at an angle at which it is totally reflected by the lower surface of the optical substrate 4, and is again reflected totally by the slope 4a formed on the side surface of the optical substrate 4. Accordingly, the attenuation of the intensity of the laser beam propagating inside the optical substrate 4 is extremely small.

This slope 4a is coated with a dielectric multilayered film 5 and can execute compensation in such a manner as to offset the phase difference between the P polarization component and the S polarization component that are generated when the laser beam is totally reflected by the lower surface of the optical substrate 4. By the way, it is advisable to set the angle of the slope 4a so as to reduce the phase difference between the polarization components.

Figure 10:
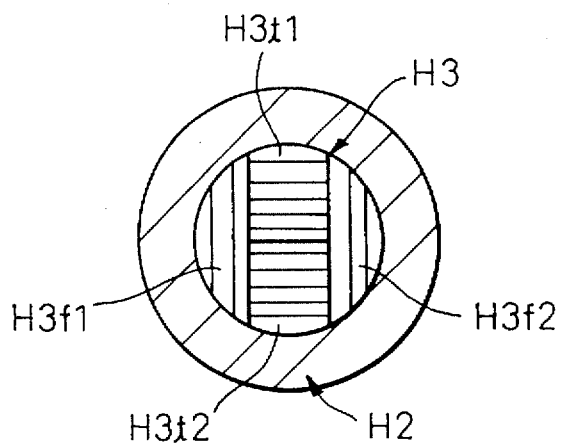
FIG. 10 is a schematic front view showing the second and third holograms in the first preferred embodiment of the present invention.

The laser beam that is totally reflected by the slope 4a is vertically incident into the second and third holograms H2, H3 formed on the lower surface of the optical substrate 4. As shown in FIG. 10, which is a schematic front view of the second and third holograms, these holograms H2, H3 are formed in such a manner that the second holograms H2 encompasses, in the ring form, the third hologram H3 which is shaped, as a whole, into a circular shape.

When the spatial frequency of the grating pattern is f2, the second hologram H2 shaped on the outer peripheral side is formed into the optimum grating pattern having (f2×$\lambda$) of at least 1.4 so that primary diffraction efficiency of the P polarization component is approximate to 0%, its 0-order transmission beam is approximately 100% whereas the primary diffraction efficiency of the S polarization component is approximately 100%, on the contrary. The value f2 is about 2,000 pcs (pieces)/mm, for example.

As a result, about 100% of the P polarization component is incident, straight-forwardly, into the second hologram H2, is emitted downward from inside the optical substrate 4, and is incident into the photoelectric element 6p for detecting the P signal. Incidentally, the P polarization component may form a focus on the photoelectric element 6p for detecting the P signal inside the detector by the second hologram H2.

The S polarization component of the laser beam is totally reflected and diffracted inside the optical substrate 4, is totally reflected by the slope 4a, is then emitted downward from the lower surface of the optical substrate 4 and is thereafter incident into the photoelectric element 6s for detecting the S signal inside the detector.

Figure 11:
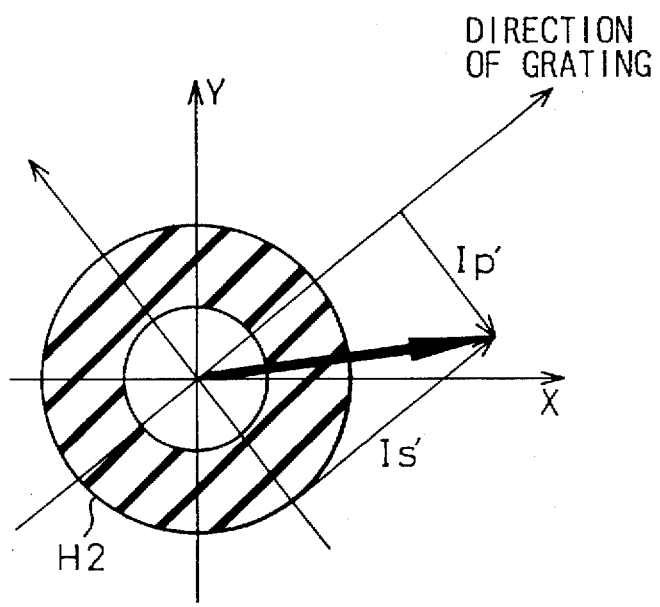
FIG. 11 is a diagram showing the operation of the second hologram in the first preferred embodiment of the present invention.

The direction of the grating of the second hologram H2 is set to an angle of optical inclination of 45° to the first hologram H1. As a result, as shown in the diagram of FIG. 11 which is useful for explaining the function of the second hologram, the P polarization component and the S polarization component are detected as Ip' and Is', respectively, while the vector is rotated by 45°, and the difference between the P and S components can be detected by magnification, when the S polarization component exists and when it does not.

Assuming hereby that the phase of the return beam as the laser beam returning from the magneto-optical disk 100 at the first hologram H1 is $\phi r$, the phase contracted to one point by the P signal detecting photoelectric element 6p is $\phi p$, the phase of the laser beam contracted to one point by the P signal detecting photoelectric element 6p at the second hologram H2 is $\phi p2$, and the phase of the laser beam contracted to one point by the S signal detecting photoelectric element 6s at the first hologram H1 is $\phi s2$, then, the phase $\phi h1$ at the first hologram H1 and the phase $\phi h2$ at the second hologram H2 are expressed by the following formulas, respectively:

$\phi h1 = \phi p - \phi r$ $\phi h2 = \phi s2 - \phi p2$

In connection with detection efficiency of the read signal beam in the apparatus having such a construction, a sufficient overall efficiency of 30% can be obtained because the diffraction efficiency in the first hologram H1 is 30% and the 0-order efficiency in the second hologram H2 can be brought to about 100%.

On the other hand, because the S polarization component is diffracted with a diffraction efficiency of about 100% in both first and second holograms H1 and H2, a sufficient overall efficiency of about 100% can be obtained, and detection can be carried out with a sufficient intensity.

As to the noise, the S polarization component diffracted in the first hologram H1, transmitting through the second hologram H2 and incident into the P signal detecting photoelectric element 6p is about 0% and the P polarization component diffracted in the first and second holograms H1, H2 and incident into the S signal detecting photoelectric element 6s is about 0%, too. Therefore, both P and S polarization components have an extremely excellent extinction ratio which represents the degree of admixture of one polarization component into the other.

Turning back to FIG. 10, the third hologram H3 has a circular shape, as a whole, which is divided by an H-shaped pattern. The hologram patterns H3f1, H3f2 for detecting the focus error are formed on the right and left side portions, and the hologram patterns H3t1, H3t2 for detecting the tracking error are formed at the upper and lower portions between the former hologram patterns.

The grating of each of the hologram patterns H3f1, H3f2 for detecting the focus error is formed in parallel with the direction of the grating of the first hologram H1 and the grating of each hologram pattern H3t1, H3t2 for detecting the tracking error is formed at right angles to the direction of the grating of the first hologram.

The spatial frequency of each hologram pattern H3f1, H3f2 for detecting the focus error is about 600 pcs (pieces) /mm, for example, and the spatial frequency of each hologram pattern H3t1, H3t2 for detecting the tracking error is about 300 pcs/mm, for example. The area ratio of the third hologram to the second hologram H2 is set to a desired ratio.

The diffracted beams at the hologram patterns H3t1, H3t2 for detecting the tracking error are incident into the photoelectric elements 6t1, 6t2 for detecting the tracking error, and a tracking servo operation is executed by the output signals from these photoelectric elements 6t1, 6t2.

The phases $\phi ht1$ and $\phi ht2$ of the hologram patterns H3t1, H3t2 for detecting the tracking error are expressed by the following formulas, respectively, where $\phi t1$ and $\phi t2$ represent the phases of the wave front which is convergent to the photoelectric elements 6t1, 6t2 for detecting the tracking error at the second hologram H2:

$\phi ht1 = \phi t1 - \phi p2$ $\phi ht2 = \phi t2 - \phi p2$

Similarly, the diffracted beams at the hologram patterns H3f1, H3f2 for detecting the focus error are incident into the photoelectric elements 6f1, 6f2 for detecting the focus error, and a focus servo operation is executed by the output signals from these photoelectric elements 6f1, 6f2.

The phases $\phi hf1$ and $hf2$ of the hologram patterns H3f1, H3f2 for detecting the focus error are expressed by the following formulas, respectively, where $\phi f1$ and $\phi f2$ represent the phases of the wave front which is convergent to the photoelectric elements 6f1, 6f2 for detecting the focus error at the second hologram H2:

$\phi hf1 = \phi f1 - \phi p2$ $\phi hf2 = \phi f2 - \phi p2$

Each of the photoelectric elements 6f1, 6f2 for detecting the focus error is split into two parts, and is set so that the movement of the laser beam on their surface due to wavelength fluctuation is offset (cancelled) by the hologram patterns H3f1, H3f2 for detecting the focus error in the first and third holograms H1, H3, and the moving distance is within 1μm ($10^{-6}$m) per wavelength of 10 nm ($10^{-9}$m), for example.

According to the construction described above, it becomes possible to detect the track error signal servo from the outputs of both photoelectric elements 6t1, 6t2 for detecting the tracking error, and to detect the focus error signal servo from the outputs of both photoelectric elements 6f1, 6f2 for detecting the focus error.

The holograms used for the apparatus of the embodiment described above can be produced by so-called "one stroke direct plotting" by irradiating the electron beam or the laser beam to the optical substrate 4.

When such direct plotting is carried out, it is necessary to improve the diffraction efficiency by forming a gradation on the section of the interference fringe of the hologram, and this can be accomplished by executing so-called "multiple plotting" which superposes the fringes with one another in a plurality of directions.

Another method of producing the hologram comprises the steps of directly plotting in advance a hologram pattern in a large size, then diminishing it by a stepper to form a mask and transferring the pattern by photolithography, etc. In this case, the grating may be converted to a saw-tooth shape by etching by an ion beam using a photoresist, etc., as the mask. The hologram can also be produced by utilizing a holographic exposure.

Figure 12:
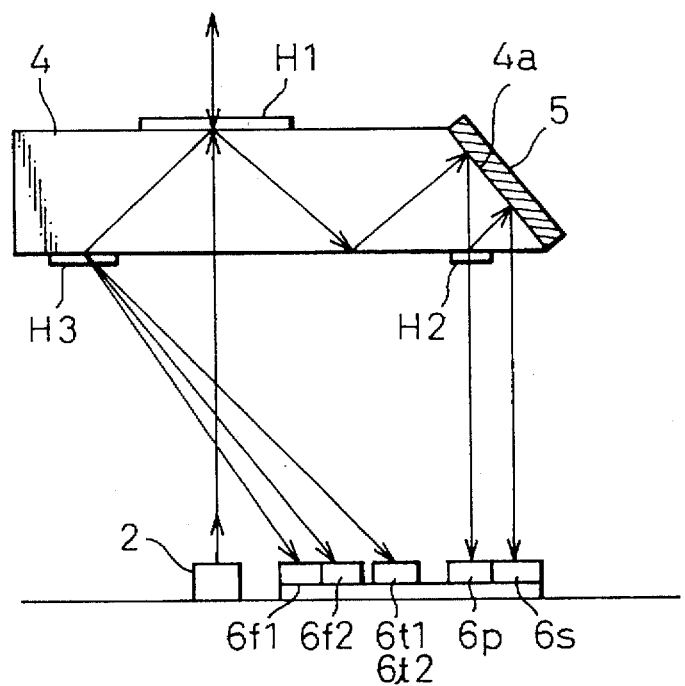
FIG. 12 is a side view showing the principal portions of the second preferred embodiment of the present invention.

FIG. 12 is a side view showing the principal portions of the second embodiment of the present invention. In the second preferred embodiment shown in FIG. 12, the third hologram H3 is disposed at the passage position of the laser beam diffracted to the opposite side to the laser beam so diffracted by the first hologram H1 as to travel towards the second hologram H2. The third hologram H3 is formed on the back of the optical substrate 4 at a position spaced apart from the second hologram H2, and its shape is the same as the shape in the first embodiment described above.

According to such a construction, the second hologram H2 need not be shaped into the ring-like shape by punching out its center portion, and the spatial frequency may be a low value of about 2,000 pcs/mm. There can thus be obtained the advantage that the hologram can be produced by holographic exposure not requiring high accuracy. Further, since polarization separability is not required for the third hologram H3, the pitch of the interference fringes may be coarse and the hologram can be easily produced by laser plotting, or the like.

Figure 13:
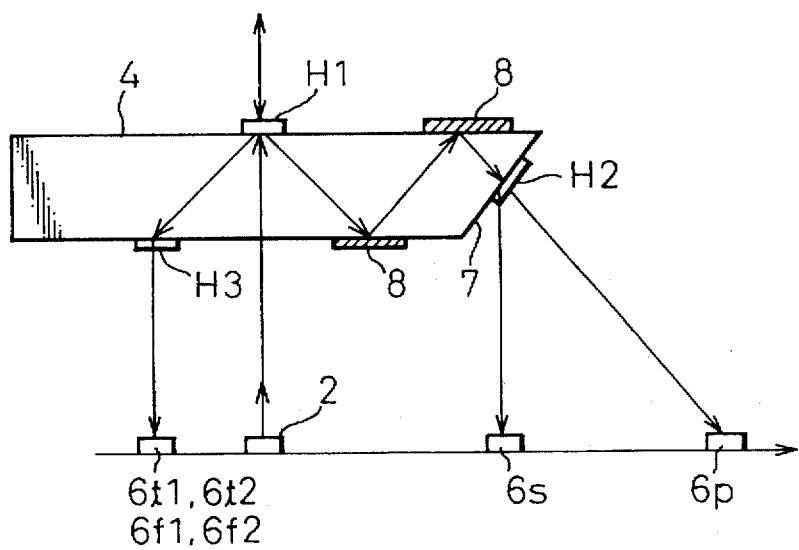
FIG. 13 is a side view showing the principal portions of the third preferred embodiment of the present invention.

FIG. 13 is a side view showing the principal portions of the third preferred embodiment of the present invention. In the third preferred embodiment shown in FIG. 13, the second hologram H2 is formed on the slope 7 which is in turn formed on the side surface of the optical substrate 4. The third hologram H3 may be formed at the same position as that of the second embodiment described above.

In this third preferred embodiment, each hologram H1, H2, H3 may be shaped into exactly the same shape as that of the second embodiment. When the outgoing angle of the laser beam from the first hologram H1 is not the total reflection angle, the reflecting film is formed at the reflecting portions 8 on both upper and lower surfaces of the optical substrate 4 and when the laser beam is totally reflected, the phase compensation film is formed instead.

Here, in order to further clarify the gists of the fourth to seventh preferred embodiments, the problems when one hologram is applied to the optical device for the optical storage unit will be described once again.

The first problem is that wavelength fluctuation due to the ambient temperature of the semiconductor laser and variance of the wavelength for each production lot of the semiconductor lasers often occur, and the beam of the laser beam is likely to move on the detector for detecting the signal or the focus of the beam is likely to deviate.

The second problem is that when the beam diameter is excessively contracted on the detector, adjustment of the beam (ray of light) on the detector in the direction of the focus of the detector and in the horizontal direction becomes difficult, so that the beam diameter must be increased. When the beam diameter is small, on the other hand, the depth of the focus becomes small and positioning of the optical axis on the detector becomes extremely difficult. In consequence, the production accuracy requirements in the vertical and transverse directions of the unitary detector become severe, and the reduction of the production cost of the optical storage unit becomes difficult as a whole.

The beam diameter can be increased by reducing the aperture, so as to simplify the adjustment of the beam on the detector, but when the aperture is made small, the loss of light power tends to become large. On the other hand, the adjustment of the axis becomes easier when the ratio of the image forming focal length for detecting the focus error to the focal length of the collimator lens is smaller. Therefore, it is important to increase the beam diameter by reducing the aperature to some extent.

The fourth to seventh preferred embodiments of the present invention are completed so as to simultaneously solve the problems described above.

Figure 14:
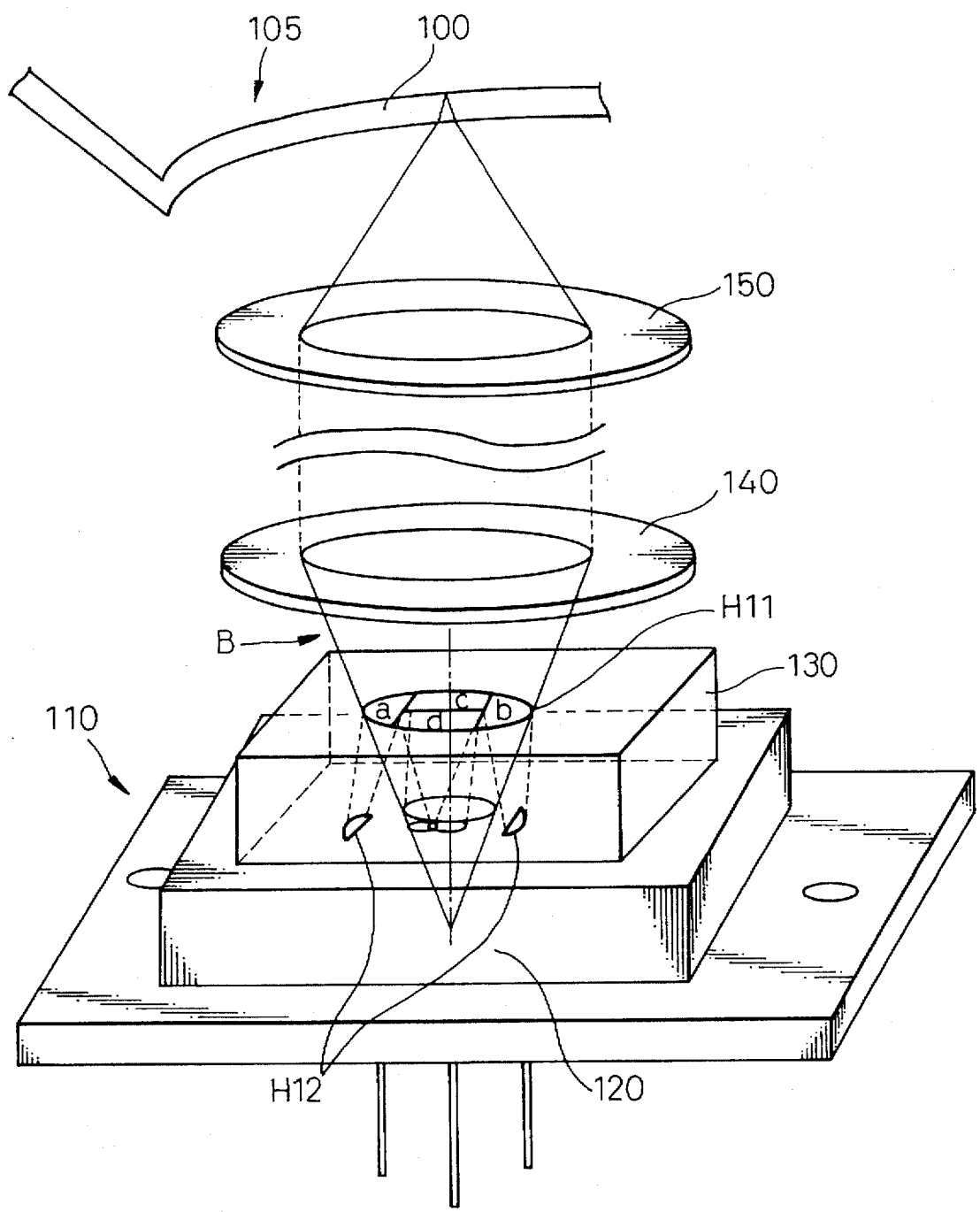
FIG. 14 is a schematic view of an optical head in the fourth preferred embodiment of the present invention.
Figure 15:
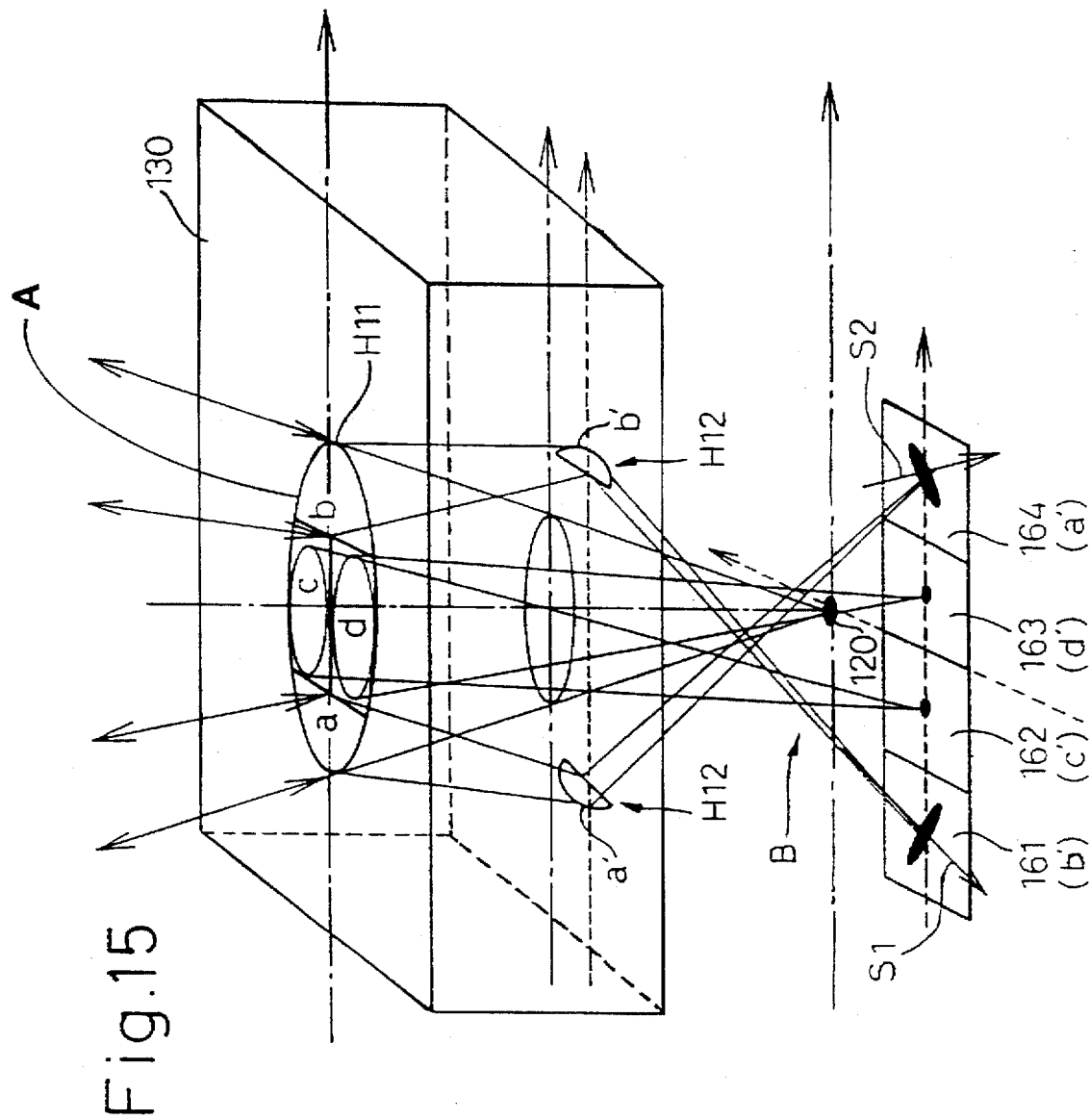
FIG. 15 is a perspective view showing the construction of the hologram in the embodiment shown in FIG. 14.
Figure 15A:
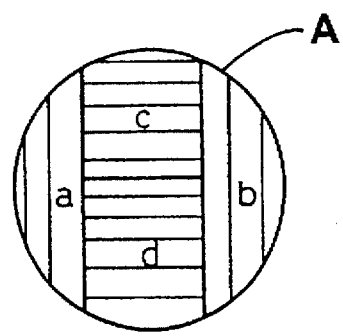
Figure 15B:
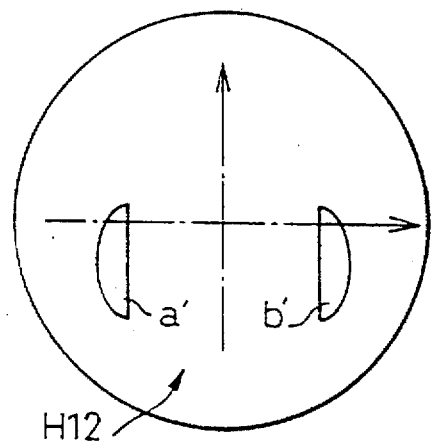

FIG. 14 is a schematic view of the optical head in the fourth preferred embodiment of the present invention; and FIG. 15 is a perspective view showing the construction of the holograms in the embodiment shown in FIG. 14.

In FIG. 14, the semiconductor laser 120 comprising a laser diode (LD), etc., is used as the light source, and the first and second holograms H11 and H12 are formed on both surfaces of a substrate 130 that constitutes the optical substrate, respectively, so as to convert the wave fronts of the laser beams emitted from the bare chip of this semiconductor laser 120. In this case, the semiconductor laser 120, the substrate 130, two two-split detectors 161, 164 for detecting the focus error (usually abbreviated as "two-split detectors for FES"), and two detectors for detecting the tracking error (which are abbreviated as "detectors for TES") 162, 163, are formed integrally with one another as a signal detecting unit 110.

In FIG. 14, further, the light source of the semiconductor laser 120, two two-split detectors 161, 164 for detecting the focus error, and two detectors 162, 163 for detecting the tracking error are formed on the same base substrate, which is disposed in the base of the signal detecting unit 110.

It should be noted that the above two two-split detectors 161, 164 and the above two detectors 162, 163 are arranged in the position which is deviated from an optical axis of the laser beam of the semiconductor laser 120.

Further, an optical substrate, which serves as an optical element utilized for a magneto-optical disk apparatus 105, is mounted on the base substrate.

In FIG. 14, further, the beam B of the laser beam emitted from the semiconductor laser 120 passes through the first hologram H11, the collimator lens 140 and the objective lens 150 and is incident into the magneto-optical disk 100 of the magneto-optical disk apparatus 105.

As shown in FIGS. 14 and 15, further, the beam B of the laser beam returning back from the magneto-optical disk 100 as the read beam is diffracted by the first and second holograms H11 and H12 and is converged to the two two-split detectors 161, 164 for detecting the focus error and to the two detectors 162, 163 for detecting the tracking error.

More concretely, the first hologram H11 positioned on the surface opposite to the bare chip of the semiconductor laser 120 in FIG. 15 (that is, on the surface of the substrate 130) comprises four hologram patterns a, b, c and d. On the other hand, the second hologram H12 positioned on the bare chip side of the semiconductor laser 120 (that is, on the back of the substrate 130) comprises two hologram patterns a' and b'. The hologram patterns of the first hologram H11 and the hologram patterns of the second hologram H12 are formed at positions that are spatially different from one another.

To detect the focus error in this case, the first read beam propagating and diffracted from one hologram pattern a of the first hologram H11 to one hologram pattern a' of the second hologram H12 and the second read beam propagating and diffracted from the other hologram pattern b of the first hologram H11 to the other hologram pattern b' of the second hologram H12 are guided to the two-split detectors 164 and 161 for detecting the focus error (hereinafter called merely "two-split detectors 161, 164"), respectively.

To detect the tracking error, on the other hand, the third read beam diffracted from still another hologram pattern c of the first hologram H11, and the fourth read beam diffracted by still another hologram pattern d, are guided to the detectors 162, 163 for detecting the tracking error, respectively.

Further, the hologram patterns a, b of the first hologram pattern H11, and the hologram patterns a', b' of the second hologram H12 shown in FIG. 15, are constituted in such a manner as to correct longitudinal and transverse aberrations on the two-split detectors 161, 164 for detecting the focus error that result from wavelength fluctuation, due to the temperature change of the semiconductor laser 120 and due to the variance of the wavelength for each production lot when the first and second read beams are diffracted by the hologram patterns. Further, the size of the luminous flux (i.e., light intensity) of the beam B of the laser beam incident into the hologram patterns a, b of the first hologram H11 is reduced when it passes through the hologram patterns a', b' of the second hologram H12.

In FIG. 15, further, the hologram patterns a', b' of the second hologram H12 are formed at the positions into which the laser beam from the semiconductor laser 120 is not incident, and this laser beam from the semiconductor laser 120 is allowed to be incident into only the hologram patterns a, b, c and d of the first hologram H11.

In FIG. 15, further, the positions of the hologram patterns a' and b' of the second hologram H12 as well as the positions of the two-split detectors 161, 164 for detecting the focus error and the positions of the hologram patterns a, b of the first hologram H11 on the opposite surface side to the bare chip of the semiconductor laser 120 are symmetric with one another, respectively with respect to a line orthogonally crossing the line that connects the hologram pattern a of the first hologram H11 to another hologram pattern b thereof.

In FIG. 15, further, the directions of the split lines S1 and D2 of the two-split detectors for detecting the focus error are inclined with respect to the direction of the optical axes of the first and second holograms H11, H12 and with respect to the movement of the in-plane direction so that the change of light intensity of the beam B of the laser beam incident into the two-split detectors 161, 164 becomes small.

Figure 17:
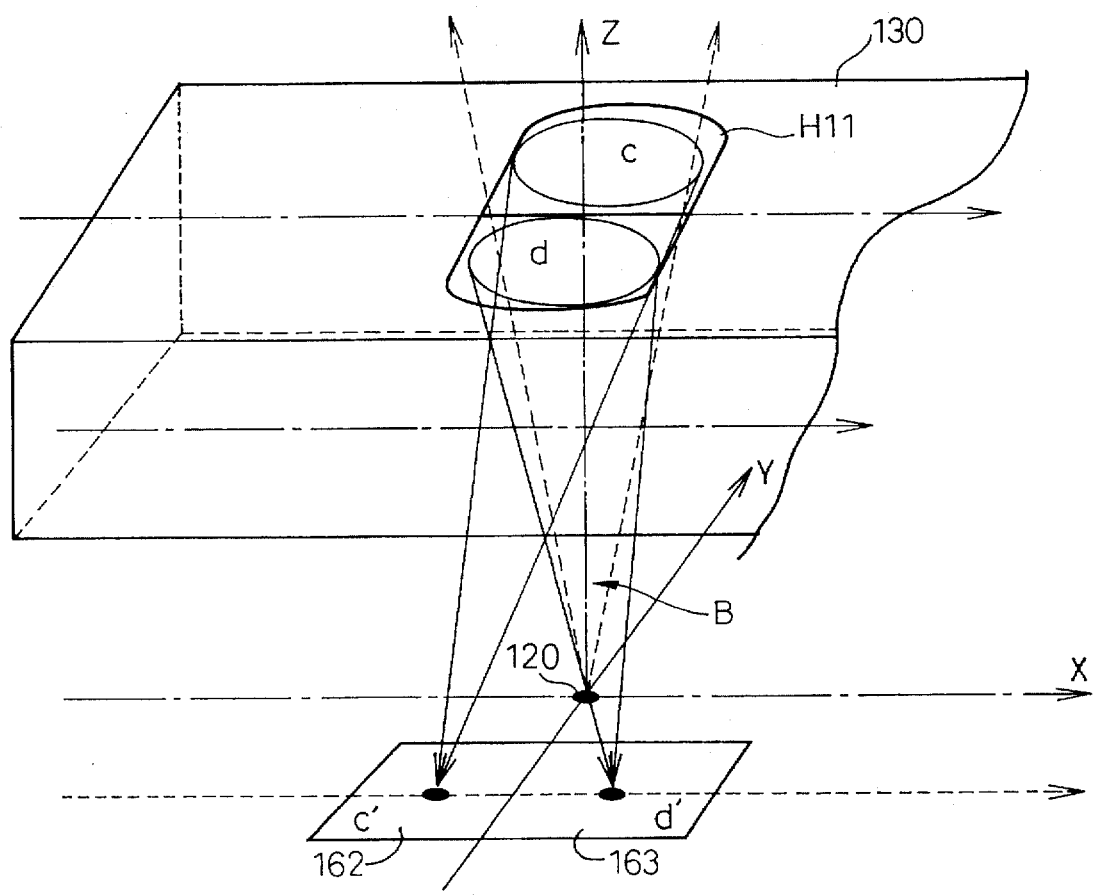
FIG. 17 is a perspective view showing in magnification the hologram portion for the tracking servo in the embodiment shown in FIG. 14.

FIG. 16 is an enlarged perspective view of the hologram portion for detecting the focus error, that is, for the focus servo, in the embodiment shown in FIG. 14, and FIG. 17 is an enlarged perspective view of the hologram portion for detecting the tracking error, that is, for the tracking servo, in the embodiment shown in FIG. 14.

In FIG. 16, the hologram pattern a of the first hologram H11 converts the laser beam returning from the collimator lens (the phase $\phi c$ on the plane of the first hologram H11) to the wave front incident into the hologram pattern a' of the second hologram H12 (the phase $\phi in$ on the plane of the first hologram H11). On the other hand, the hologram pattern a' of the second hologram H12 converts the wave front incident into this hologram pattern a') (the phase $\phi in$ ② the second hologram H12) to the wave front converged to the detector 164 for focus servo (the phase $\phi fes$ on the second hologram H12).

When the phase transmission functions of the first and second holograms H11, H12 satisfying the wave front conversion of the laser beam described above are $\phi a$ and $\phi a'$, they are expressed by the following formulas, respectively:

$$\phi a = \phi in - \phi c$$

$$\phi a' = \phi fes - \phi in ②$$

At this time, the holograms a and a' can be optimized, under the condition that the longitudinal and transverse aberrations are reduced and the aperture of the hologram pattern a' smaller than that of the hologram pattern a (that is, the condition which forces to reduce the aperture) even when the wavelength of the laser diode, etc., fluctuates.

As a result, even when about 10 nm of wavelength fluctuation occurs in the laser diode, etc., the transverse aberration of the beam B is extremely as small as 1μm.

Because the aperture diameter D of the hologram is determined by one hologram, that is, the first hologram, without an optical loss, the allowable error in the direction of the optical axis due to the movement of the hologram in the focal direction (Z direction) can be expanded from several μm to 40μm.

As to the hologram for the track servo, because it converts the returning beam (phase $\phi c$) returning back from the collimator lens 140 to the converged waves (phases $\phi tc$, $\phi td$) incident into the detectors 162, 163 for detecting the tracking error as shown in FIG. 15, the propagation transmission functions $\phi c'$, $\phi d'$ in the hologram patterns c, d are expressed by the following formulas:

$$\phi c' = \phi tc - \phi c$$

$$\phi d' = \phi td - \phi c$$

As to focus error signal servo and track error signal servo, they can be detected in accordance with the following formulas when the four detector portions, in total, of the two-split detectors 161, 164 for detecting the focus error are A, B, C and D, and the detector portions in the detectors 162, 163 for detecting the tracking error are #c and #d, respectively;

$$FES = (A+C) - (B+D)$$

$$TEC = \#c - \#d$$

Though the explanation is given on only the hologram pattern a, the hologram pattern b can be produced in the same way when this hologram pattern b is formed at an exactly the same symmetric position as described already.

Figure 18:
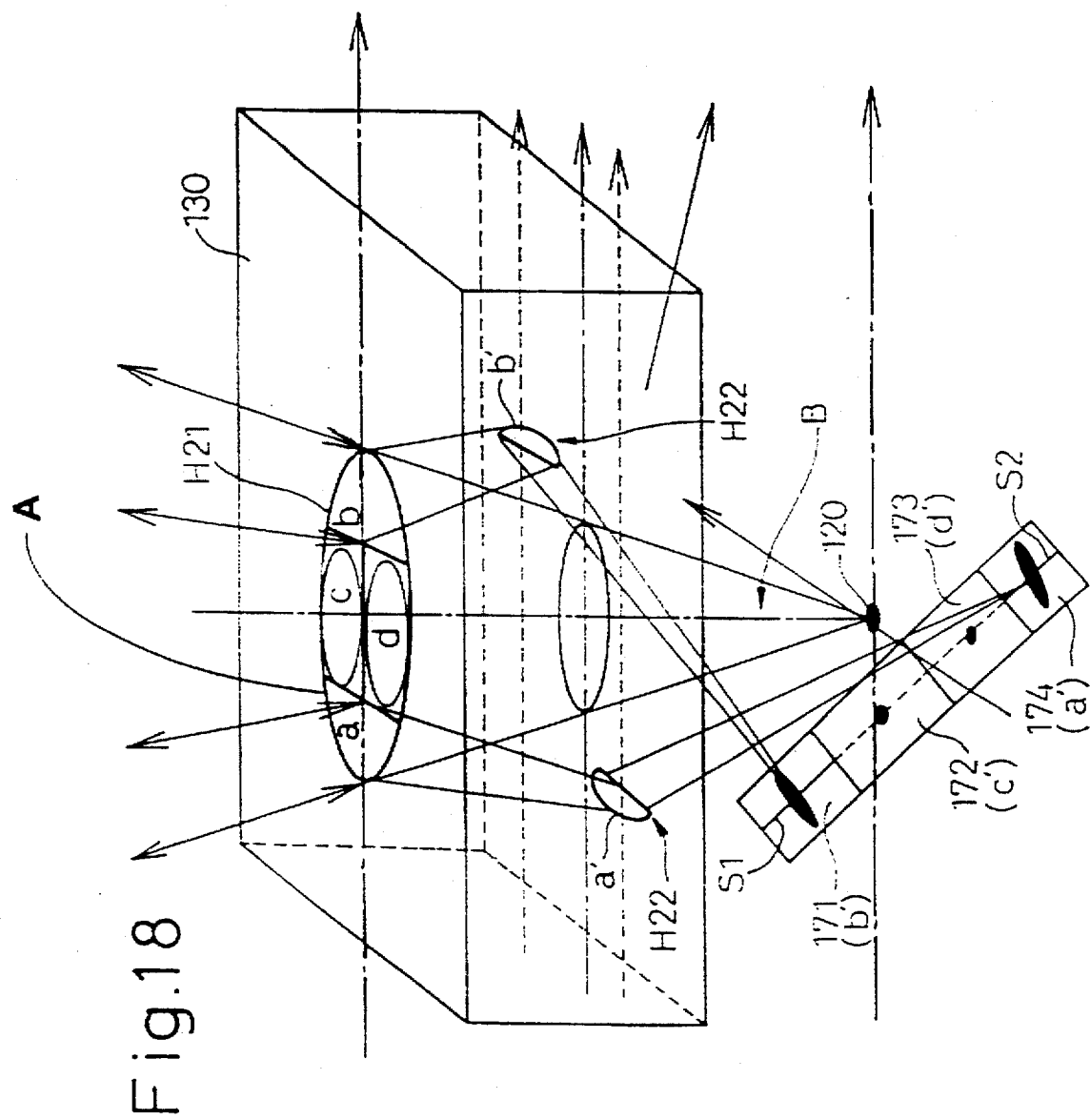
FIG. 18 is a perspective view showing the construction of the hologram in the fifth preferred embodiment of the present invention.
Figure 18A:
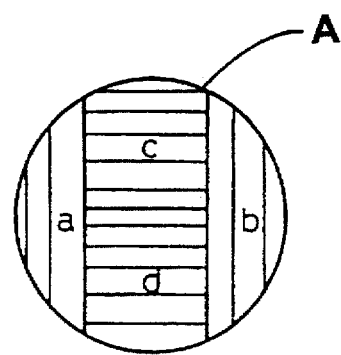
Figure 19:
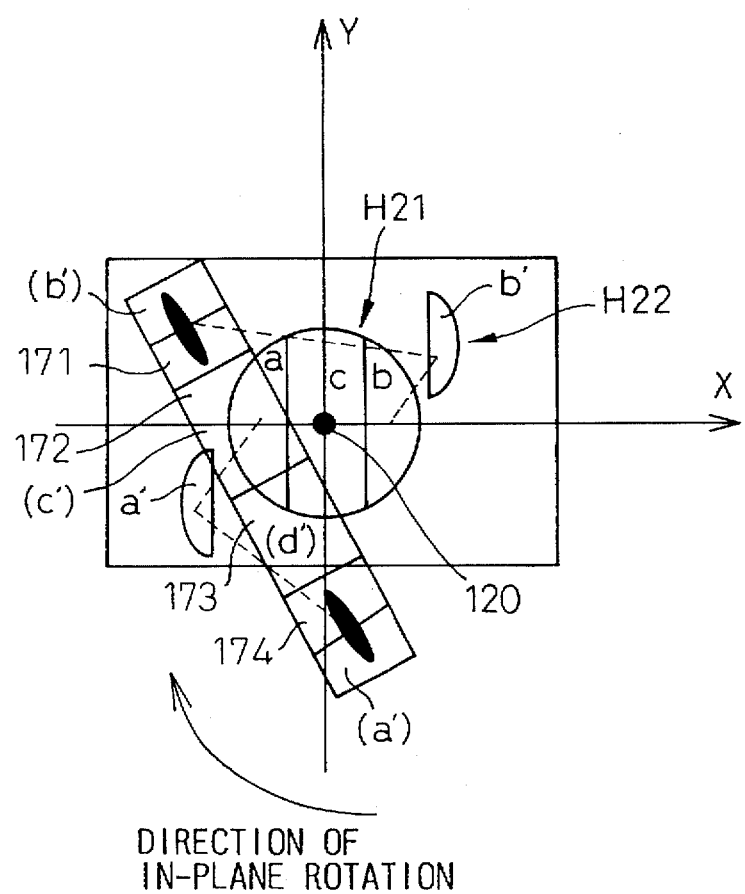
FIG. 19 is a top view showing the construction of the hologram in the fifth preferred embodiment of the present invention.

FIG. 18 is a perspective view showing the construction of the hologram in the fifth preferred embodiment of the present invention, and FIG. 19 is a top view showing the construction of the hologram in the fifth preferred embodiment of the invention.

As shown in FIGS. 18 and 19, the first hologram 21 positioned on the opposite surface side to the bare chip of the semiconductor laser 120 comprising the laser diode, etc., (that is, on the face of the substrate 130) comprises four hologram patterns a, b, c and d in the same way as in the fourth embodiment. On the other hand, the second hologram H22 positioned on the bare chip side of the semiconductor laser 120 (that is, on the back of the substrate 130) comprises two hologram patterns a' and b'. The hologram patterns of these first and second holograms H21, H22 are formed at positions that are spatially different from one another.

To detect the focus error in this case, the first read beam propagating and diffracted from one of the hologram patterns a of the first hologram H21 to one of the hologram patterns a' of the second hologram H22 and the second read beam propagating and diffracted from another hologram pattern b of the first hologram H21 to another hologram pattern b' of the second hologram H22 are guided to the two-split detectors 171, 174 for detecting the focus error, respectively.

On the other hand, the third read beam diffracted from still another hologram pattern c of the first hologram H21 and the fourth read beam diffracted by still another hologram pattern d of the first hologram H21 are guided to the detectors 172, 173 for detecting the tracking error, respectively, so as to detect the tracking error. The construction, in which the four detectors are disposed, is analogous to the construction of the fourth embodiment described above.

However, the fifth preferred embodiment of the present invention shown in FIGS. 18 and 19 is different from the fourth embodiment in that the positions of the hologram patterns a' and b' of the second hologram H22 disposed on the back of the substrate 130 and the positions of the split detectors 171, 174 for detecting the focus error, which correspond to these hologram patterns a', b', are so set as to be substantially point-symmetric with one another, respectively, with the semiconductor laser 120 being the center of the point. The change of the beam shapes of the laser beams incident into the two-split detectors 171 and 174 is made equal with respect to the adjustment of in-plane rotation of the first and second holograms H21 and H22. In other words, the fifth embodiment of the present invention is constituted in such a manner that the change of the beam diameter of the laser beam becomes small in connection with the adjustment of rotation of the holograms.

In the embodiment described above, the hologram patterns a to d of the first hologram H21 and the hologram patterns a' and b' of the second hologram H22 are produced by direct plotting by a laser beam or an electron beam, or by a means such as photolithographic transfer using a photomask. Particularly in the case of the hologram patterns a' and b' of the second hologram H22, the holograms can be produced highly efficiently by holographic exposure which records the wave front from a CGH (Computer Generated Hologram) as a body wave because the hologram patterns are mutually separated.

In the fourth and fifth preferred embodiments of the invention described above, two holograms are used for the optical system of the optical head for the optical storage unit such as the magneto-optical disk apparatus, and servo detection is conducted by the optical device formed by integrating the substrate having such holograms formed thereon with the semiconductor laser and the detectors such as the photodetectors. Servo detection includes focus error detection and tracking error detection. Further, the two-hologram construction using the first and second holograms for image-forming the beam for detecting the focus error is devised so as to accomplish a variable structure of an F number expressed by a ratio f/D of the focal length of the beam to the aperture diameter D of the hologram and a cancel structure which prevents the change of the converging position of the beam even when the wavelength of the semiconductor laser changes.

However, when the structure which prevents the change of the convergent position of the beam even at the wavelength fluctuation of the semiconductor laser is employed, the interference fringes constituting the hologram pattern of the hologram become complicated, and the image formation property of the beam is deteriorated when the position error occurs in the glass substrate on which the thin film of the hologram is formed. This deterioration of the beam image formation property affects the detection of the focus error. In other words, there is the case where the problem that the margin of disposition of the glass substrate having the hologram mounted thereto markedly deteriorates. The margin of disposition of the glass substrate is dependent on whether or not the optical system of the optical device has an aplanatic structure.

The term "aplanatic structure" hereby means the structure which does not change the image formation state of the beam even when optical components constituting an optical device move. When the beam is converged by using a lens, for example, there is the case where the beam is obliquely incident but the image formation state of the beam does not easily collapse. It is more difficult to accomplish the aplanatic structure by using the hologram than by using the lens.

Therefore, the sixth and seventh preferred embodiments of the present invention devise the interference fringes of the hologram which provide a structure approximate to the aplanatic structure, in order to avoid the problem of deterioration of the image formation property of the beam due to the positioning error of the glass substrate having thereon the hologram.

Figure 20:
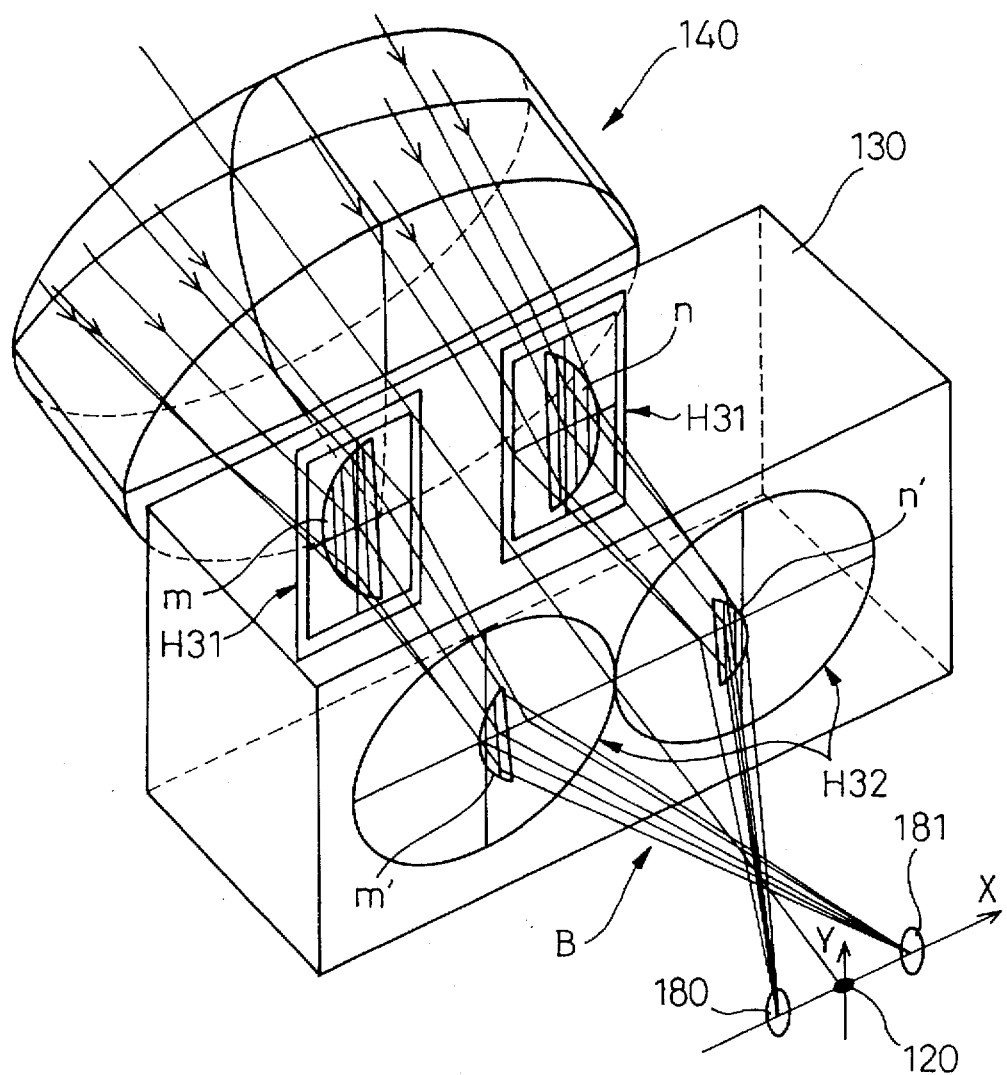
FIG. 20 is a perspective view showing the construction inclusive of a return path of beams in the sixth preferred embodiment of the present invention.
Figure 21:
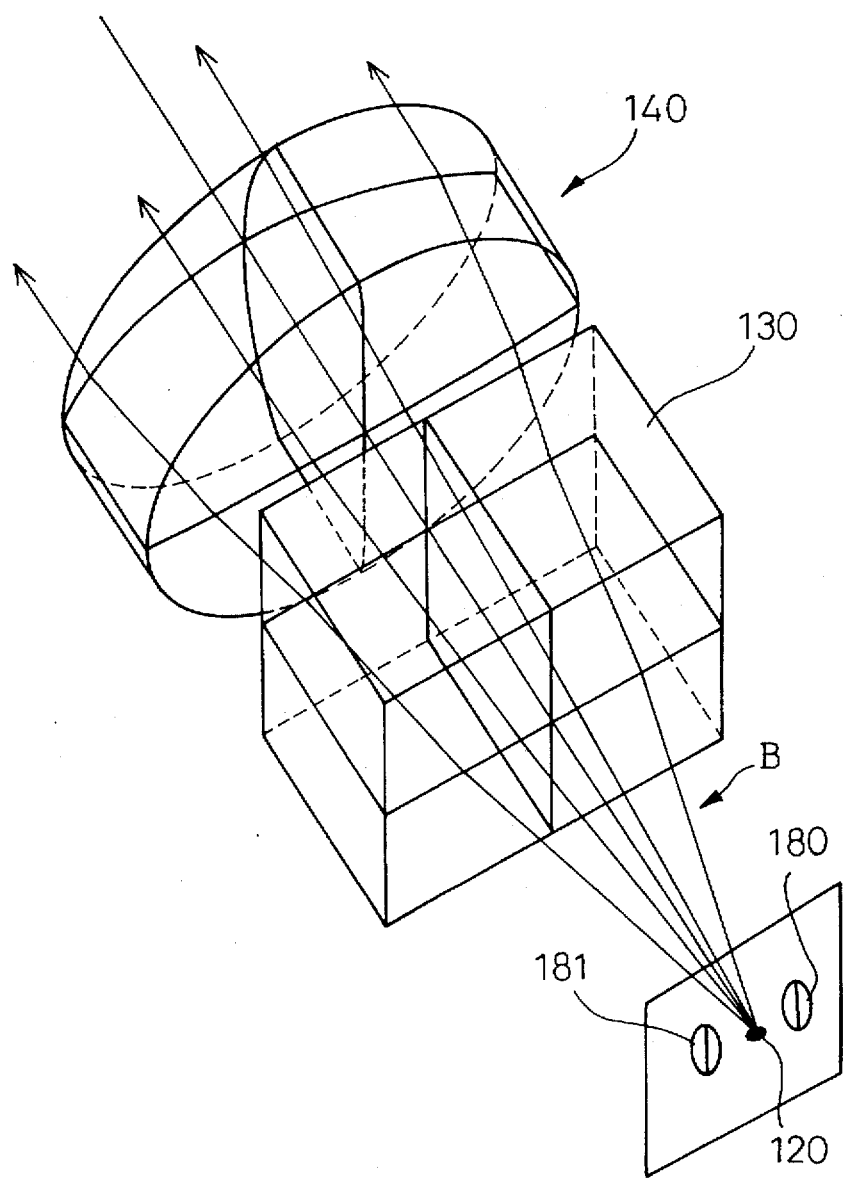
FIG. 21 is a perspective view showing the construction inclusive of a going path of beams in the sixth preferred embodiment of the present invention.

FIG. 20 is a perspective view showing the construction inclusive of the return path of the beams in the sixth preferred embodiment of the present invention, and FIG. 21 is a perspective view showing the construction inclusive of the going path of the beam in the sixth preferred embodiment of the invention.

As shown in FIGS. 20 and 21, in the optical device for the optical storage unit including the optical storage medium such as the CD, the optical disk, the magneto-optical disk, etc., the semiconductor laser 120 comprising the laser diode, etc., is used as the light source, and the first and second holograms H31 and H32 for converting the wave front of the laser beam emitted from the bare chip of this semiconductor laser 120 are formed on the face and back of the substrate 130 constituting the optical substrate. In this case, the semiconductor laser 120, the substrate 130 and the two two-split detectors 180, 181 for detecting the focus error are formed integrally with one another into an integrated optical head.

More concretely, the two-split detectors 180, 181 such as the photodetectors for detecting the focus error are so disposed as to oppose emission of the semiconductor laser 120 in FIG. 20. The optical system of the optical head comprises the collimator lens 140; the substrate 130 such as a glass substrate having the thin films of the first and second holograms H31, H32 formed on both surfaces thereof; the beam emission point of the semiconductor laser 120; and the two-split detectors 180, 181. The hologram patterns m and n of the first hologram H31 for image-forming the beam comprising the beam B used for detecting the focus error and the hologram patterns m' and n' of the second hologram H32 are formed on the substrate 130 such as the glass substrate. The perspective view of FIG. 20 represents the return path of the beam for detecting the focus error.

The outward path (i.e., going path) of the beam comprising the beam B emitted from the semiconductor laser 120 is shown in FIG. 21. As shown in FIG. 21, the 0-order transmission beam of the first hologram H31 travels towards the collimator lens 140 in the going path of the beam, is converted to the parallel beams by this collimator lens 140, and then travels towards the objective lens (not shown) on the side of the optical storage medium. Further, the beam incident into the objective lens is converged on the optical storage medium by the objective lens, is then reflected on this optical storage medium, passes through the collimator lens 140 in the same route as the outward path on the optical storage medium and travels towards the first hologram H31. In the return path, the beam contracted by the collimator lens 140 is diffracted by the first hologram H31, then travels towards the second hologram H32, is further diffracted by this hologram H32 and forms the image on the two-split detectors 180 and 181. To detect the focus error, a Foucault method, which detects the position error of the beam from the difference of light power of the beams reaching the two-split detectors 180 and 181 from two directions, is employed. In this case, the focus error detection is accomplished by two beams propagating from the hologram patterns m, n to the hologram patterns m', n'.

In other words, the laser beam from the semiconductor laser 120 passes through the first hologram H31, is then incident into the optical storage medium and returns as the read beam to the first hologram H31. The read beam which propagates from the first hologram H31 to the second hologram H32, and is diffracted there, is guided to the two-split detectors 180, 181 for detecting the focus error.

Here, the direction of diffraction of the beam is determined by the interference fringes of the hologram patterns of the holograms. When the wavelength of the semiconductor laser 120 simultaneously changes due to the temperature change, too, the beams of the return path are diffracted by the two holograms H31, H32 and are constituted as the hologram interference fringes so that the beams form the image at the same position. In this case, the achromatic condition of Conrady (wavelength cancel structure) is that the lengths of the optical paths other than the phase transmission functions of the holograms are equal.

Therefore, in order to accomplish the cancel structure by the two holograms, it is necessary that this condition is approximately satisfied, or the quantities of the phase transmission functions of the two holograms offset each other. More concretely, the interference fringes of the first hologram H1 are formed in such a manner as to be gradually dense towards the dense outer portion from the coarse center portion, and the interference fringes of the second hologram H32 are formed in such a manner as to be gradually coarse towards the coarse outer portion from the dense center portion. Each of the interference fringes of each of the first and second holograms has only a unidirectional component. When the X-Y coordinates system is decided as shown in FIG. 20, for example, the component of each of the interference fringes is only the Y direction component.

Figure 22:
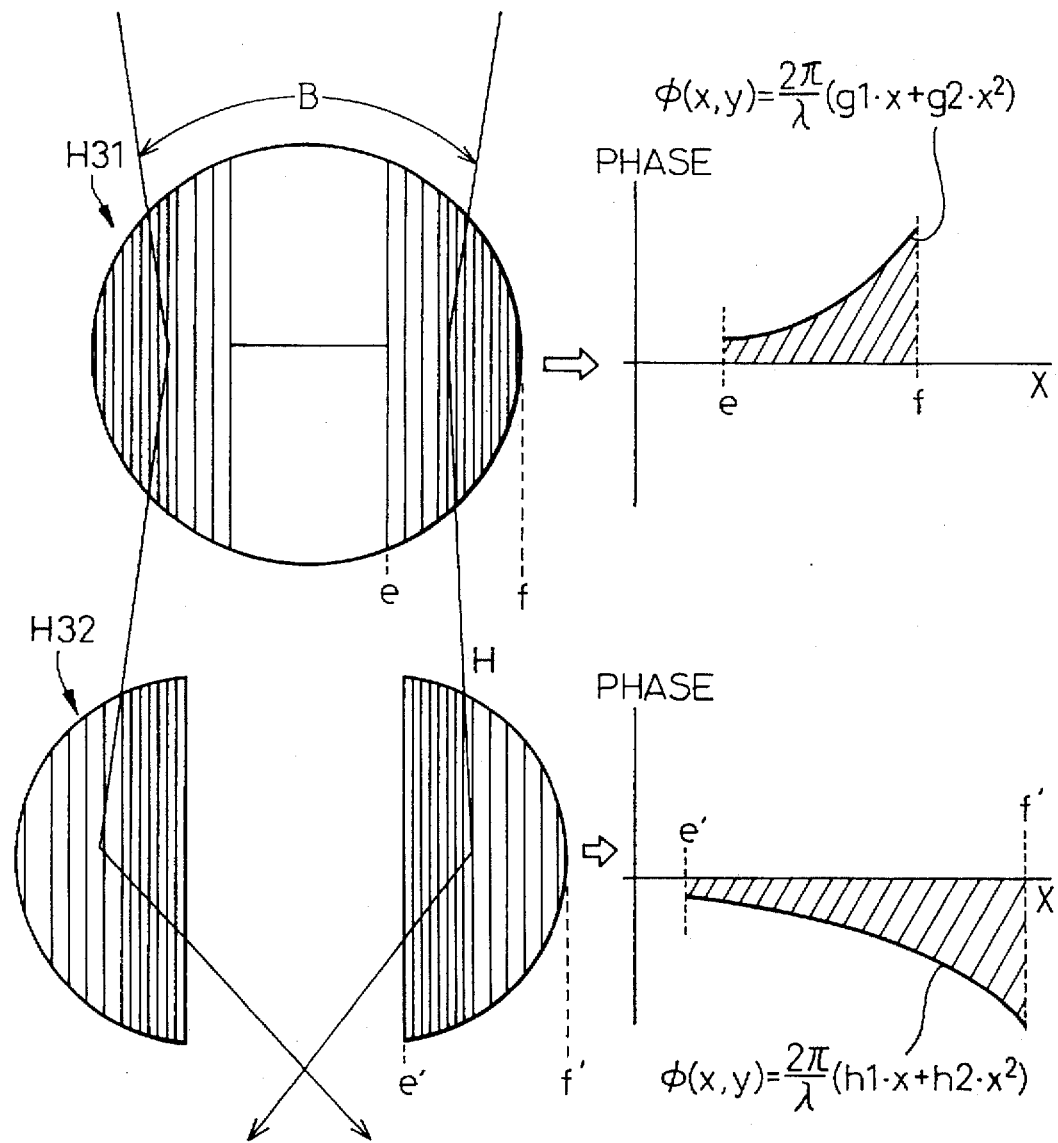
FIG. 22 is a view showing the state of an interference fringes of the hologram in the sixth preferred embodiment of the present invention.

FIG. 22 shows the condition of the interference fringe of the hologram in the sixth preferred embodiment of the present invention.

In the construction of the holograms shown in FIGS. 20 and 21, each hologram is produced in such a manner that the components of the interference fringes of the two holograms H31 and H32 for forming the image of the beam B for detecting the focus error, as shown in FIG. 22, exist in only the X direction in order to limit the collapse of the beam diameter to such an extent that no substantial influence is exerted to the focus error even when the hologram itself (substrate 130 itself) moves (or when the disposition error occurs).

For example, the phase transmission functions of the first hologram H31 can be expressed by the following formulas:

$$\phi(x, y)=(2\pi/\lambda)(g1 \cdot x + g2 \cdot x^2)$$

$$\phi(x, y)=(2\pi/\lambda)(h1 \cdot x + h2 \cdot x^2)$$

(where $\lambda$ is the wavelength of the laser beam).

In this case, achromatization can be accomplished by selecting appropriate values for the coefficients g1, g2, h1 and h2 so that the phase quantities of the two holograms offset each other and the achromatization condition of Conrady can be satisfied. In this case, the phase transmission functions of the first and second holograms H31, H32 satisfy the relation g2·h2 <0. In other words, as shown at the e-f portion on the right side of FIG. 22, the phase transmission function comprises off-axis component of only the unidirectional component and the parabolic phase.

The following numerical formula 1 typically represent the example where the values of the coefficients g1, g2, h1 and h2 are set for the phase transmission functions of the first and second holograms H31 and H32:

Numerical Formula 1
(Phase transmission functions of first hologram)
$\phi(x, y)=(2\pi/\lambda)(-0.223224 x - 0.083098 x^2)$, and
$\phi(x, y)=(2\pi/\lambda)(0.223224 x - 0.083098 x)$
(Phase transmission functions of second hologram)
$\phi(x, y)=(2\pi/\lambda)(0.909917 x + 0.253407 x^2)$, and
$\phi(x, y)=(2\pi/\lambda)(-0.909917 x + 0.253407 x^2)$
(where: $\lambda$ is the wavelength, typically $\lambda$=680 nm).

When the beam emission point of the semiconductor laser is plotted at the origin in the sixth embodiment described above, the beam emission point and the two-split detectors 180, 181 are aligned on the same straight line such as the X axis.

Figure 23:
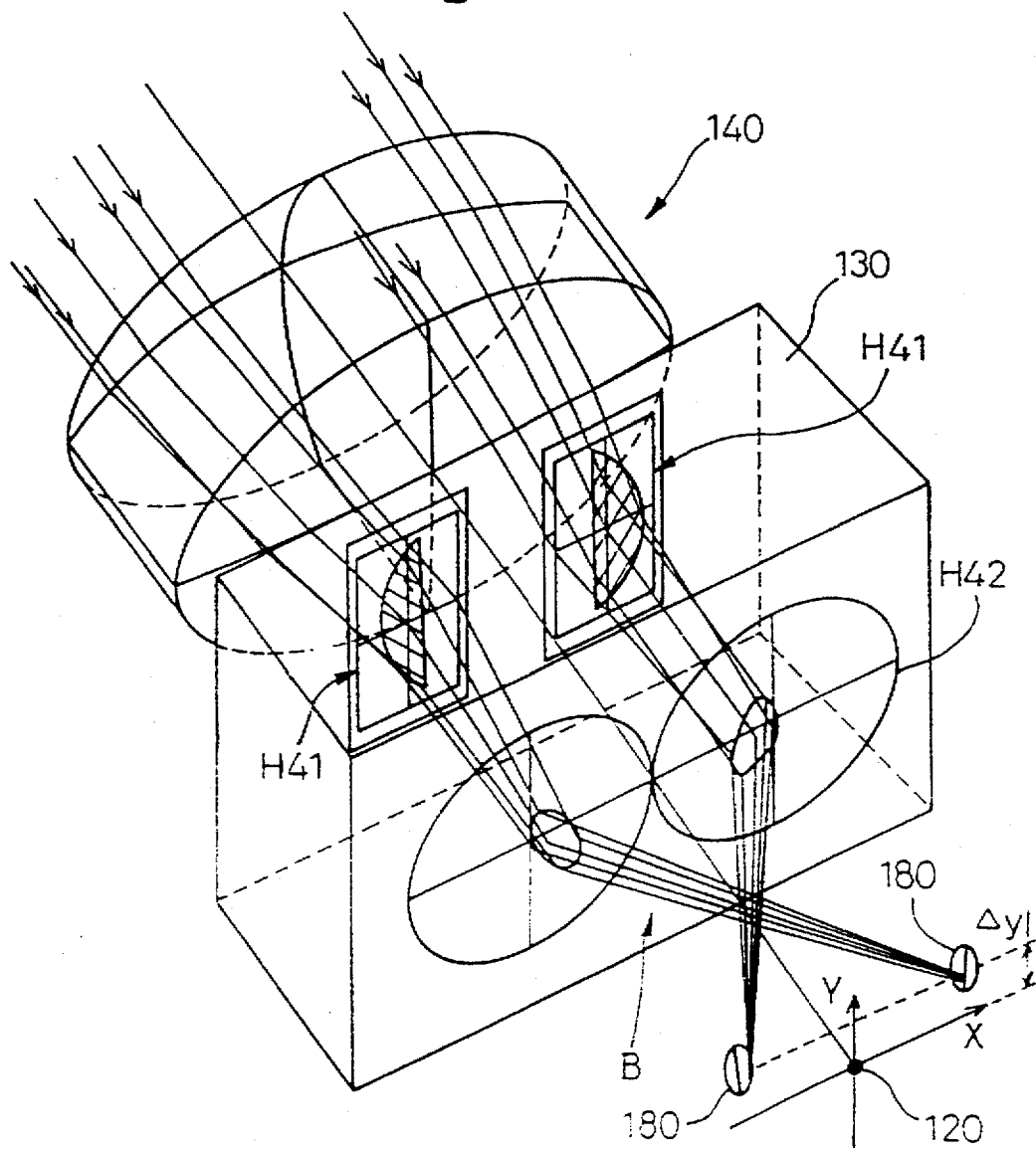
FIG. 23 is a perspective view showing the construction of the seventh preferred embodiment of the present invention.
Figure 23A:
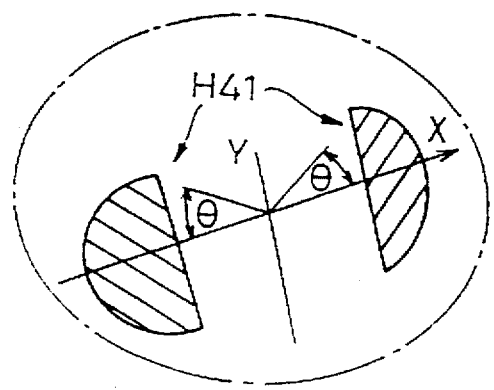
Figure 24:
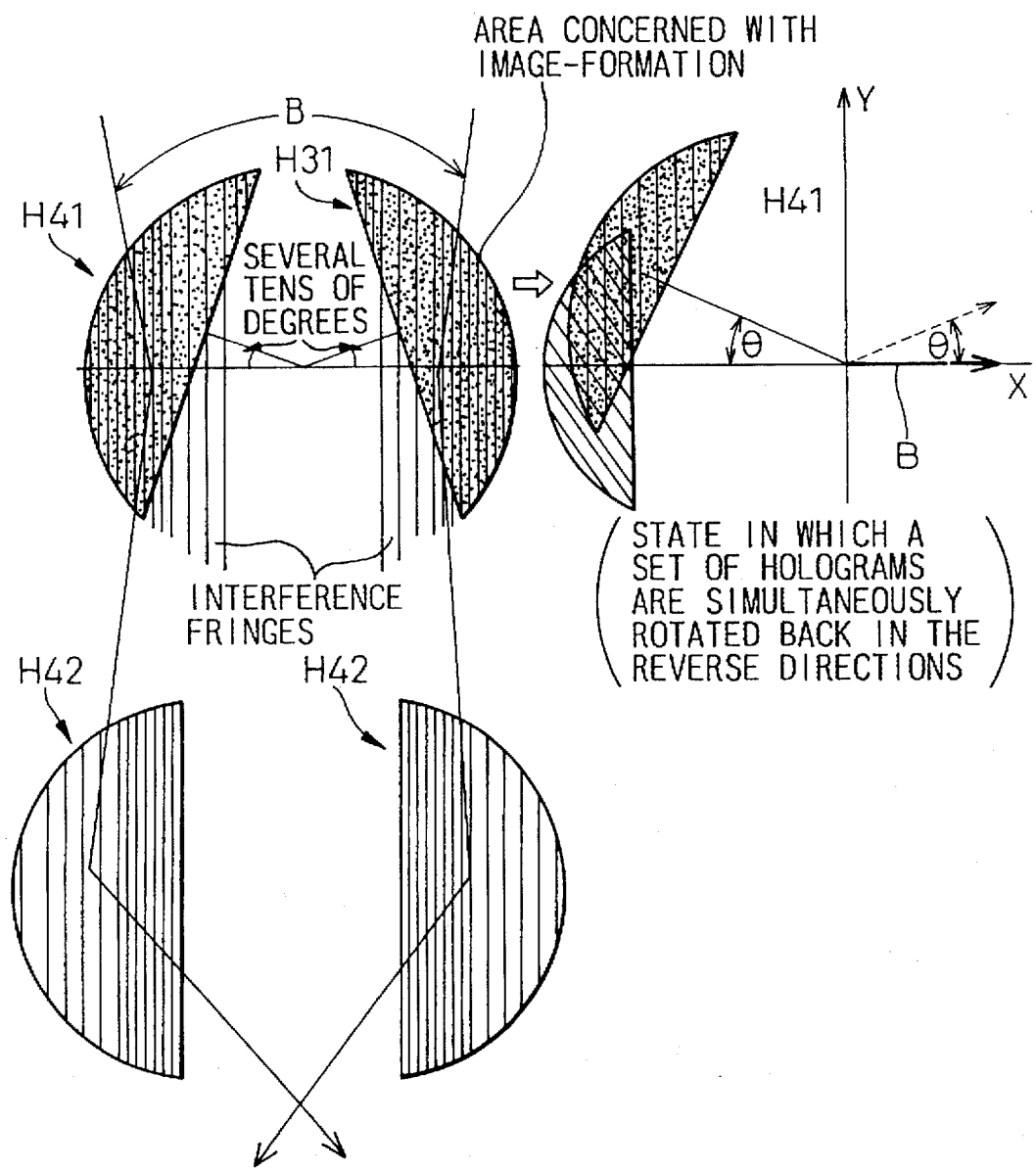
FIG. 24 is a view showing the mode of executing a position change of beams by the rotation of the hologram in the seventh preferred embodiment of the present invention.

FIG. 23 is a perspective view showing the construction of the seventh preferred embodiment of the present invention, and FIG. 24 is a view showing the position shift of the beam by the rotation of the hologram in the seventh preferred embodiment.

In the sixth embodiment described above, the construction where the beam emission point of the semiconductor laser 120 and the two-split detectors 180, 181 are aligned on the X axis, but in the seventh preferred embodiment, the two-split detectors 180, 181 are deviated in the Y direction from the beam emission point of the semiconductor laser 120.

In the optical devices for the optical storage units, it is technically difficult in most cases to mount the semiconductor laser for emitting the laser beam (such as the laser diode) and the detector for receiving the laser beam (such as the photodetector) to the same position. In FIGS. 23 and 24, the interference fringes of the first and second holograms H41 and H42 having the same phase transmission functions as that of FIG. 22 are rotated by $\ominus$ integrally with these holograms and the positions of the two laser beams for forming the images on the two-split detectors 180, 181 for detecting the focus error are deviated in the direction orthogonally crossing the line connecting these two laser beams (for example, by $\Delta y$ in the Y direction). According to this construction, the semiconductor laser 120 and the two-split detectors 180, 181 need not be aligned on the same straight line, and the problem described above can be thus solved.

Further, when the semiconductor laser 120 and the two-split detectors 180, 181 are not aligned on the same straight lines, the phase transmission function of the hologram must comprise only the off-axis [$\phi(x, y)=kx$] and the parabolic phase [$\phi(x, y)=kx^2$], in order for the beam diameter to more difficultly collapse (that is, to bring the beam diameter closer to the aplanatic state) with respect to the position error due to the movement of the substrate 130 having the hologram formed thereon.

The seventh preferred embodiment described above produces the interference fringes in the same way as in the sixth preferred embodiment and uses the region associated with the image formation of the beam by rotating the above region by several tens of degrees, as shown in FIG. 24. Since the interference fringes in this case are the same as those of the sixth preferred embodiment, the beam is converged at the position indicated by the solid line with the arrow on the X axis as shown at the right-hand portion of FIG. 24. Further, when the set of the two holograms H41 and H42 are simultaneously rotated back in the reverse directions, the beam can be converged at a position deviated by an angle $\ominus$ in the Y direction from the X axis as indicated by the dotted line with the arrow.

As described above, in the first place, the laser beam emitted from the semiconductor laser in this preferred embodiment passes through the first hologram and strikes the optical storage medium such as the magneto-optical recording medium, and the laser beam reflected by this optical storage medium is reliably separated into the two polarization components by the first and second holograms H1 and H2. Therefore, when the difference of intensity of both polarization components is detected by the detector, etc., the signal of the optical storage medium can be easily detected by a simple construction of an optical element including the two holograms.

According to the preferred embodiments of the present invention, in the second place, the two holograms are formed on the upper and lower surfaces of the optical substrate such as a substrate and this optical substrate is assembled into the package of the semiconductor laser. In this way, an economical and light-weight optical device for an optical storage unit can be produced. After the two polarization components necessary for detecting the signal representing the state of the optical storage medium are accurately separated from the laser beam which is incident into the optical storage medium and then returns, by the combination of the two holograms, these polarization components are guided to the respective detectors such as the photoelectric devices. In this way, the signal from the optical storage medium can be easily detected.

According to the preferred embodiments of the present invention, in the third place, when the third hologram is formed on the optical substrate in addition to the first and second holograms, the laser beam reaching this third hologram is diffracted in a plurality of mutually different directions. When the intensities of these laser beams are respectively detected, the focus error as well as the tracking error can be detected. As a result, the number of the optical elements can be reduced to a minimum, and the cost of production, and the size, and weight of the optical device for the optical storage unit, can be drastically reduced.

According to the preferred embodiments of the present invention, in the fourth place, the laser beam from the semiconductor laser is allowed to be incident into only the hologram patterns of the first hologram. Therefore, the second and third holograms which emit the signal of the read beam returning from the optical storage medium are not directly affected by the wavelength fluctuation of the semiconductor laser, etc. As a result, the position error of the beam and the deviation of the beam focus on the detector can be reduced to minimum.

According to the preferred embodiments of the present invention, in the fifth place, the direction of the grating of the second hologram is optically inclined at 45° to the direction of the grating of the first hologram so as to enlarge and detect the intensity difference between the S polarization component and the P polarization component contained in the reflected beam from the optical storage medium. In this way, the signal of the optical storage medium can be detected more correctly.

According to the preferred embodiments of the present invention, in the sixth place, the laser beam, which is once reflected totally inside the optical substrate, is again reflected totally on the slope and is allowed to be perpendicularly incident into the second hologram. In this way, signal detection can be carried out more correctly.

According to the preferred embodiments of the present invention, in the seventh place, the laser beam, which is once reflected totally inside the optical substrate, is prevented from generating the phase difference between the two orthogonally crossing polarization components thereof by the phase compensation film formed on the slope.

According to the preferred embodiments of the present invention, in the eighth place, the value $(f \times \lambda)$, where $\lambda$ is the wavelength of the laser beam emitted from the semiconductor laser, and f is the spatial frequency of the grating of the first or second hologram, is set to be at least 1.4. In this way, separability of the two polarization components of the laser beam, which orthogonally cross each other, can be improved, and the two polarization components can be emitted with a sufficient intensity from the second hologram, so that signal detection can be made correctly.

According to the preferred embodiments of the present invention, in the ninth place, the third hologram causes the laser beams, which are diffracted by a plurality of hologram patterns for detecting the focus error for the optical storage medium and by a plurality of hologram patterns for detecting the tracking error, to be incident into separate detection means, and the focus error and the tracking error can be detected accurately from the outputs of these separate detection means.

According to the preferred embodiments of the present invention, in the tenth place, the third hologram forms the hologram pattern for detecting the focus error and the hologram pattern for detecting the tracking error by utilizing the right and left side portions when its circular shape is divided into H-shaped patterns. Therefore, no difficulty occurs concerning the production of the holograms by adding the third hologram.

According to the preferred embodiments of the present invention, in the eleventh place, since the second hologram is formed round the third hologram, the increase in the occupying area of the holograms due to the addition of the third hologram can be restricted.

According to the preferred embodiments of the present invention, in the twelfth place, the third hologram is formed on the same plane of the optical substrate but on the opposite side to the second hologram. Therefore, the detection of the S and P polarization components, the detection of the focus error and the detection of the tracking error can be carried out accurately and mutually independently.

According to the preferred embodiments of the present invention, in the thirteenth place, the optical storage unit can be constituted into an extremely simple and light-weight construction, by assembling the optical substrate into the package of the semiconductor laser so as to integrate the optical substrate with the semiconductor laser.

According to the preferred embodiments of the present invention, in the fourteenth place, the hologram pattern for detecting the focus error and the hologram pattern for detecting the tracking error are so formed as to encompassed by the hologram for reading/writing of the optical storage medium. Therefore, the areas of the hologram patterns and the optical substrate can be markedly saved, and the optical device for the magneto-optical recording medium which is small in size and light in weight can be accomplished.

According to the preferred embodiments of the present invention, in the fifteenth place, the semiconductor laser is used as the light source, and optical substrate, e.g., substrate which is equipped with the first and second holograms, two split detectors for detecting the focus error, and two detectors for detecting the tracking error, are integrated with one another. Therefore, a compact and light-weight optical device can be produced.

According to the preferred embodiments of the present invention, in the sixteenth place, the phase transmission functions are optimized, under the condition that the aperture diameter of the second hologram is smaller than that of the first hologram. In this way, the longitudinal and transverse aberrations on the split detectors for detecting the focus error, which results from the wavelength fluctuation due to the temperature change of the semiconductor laser or due to variance of the wavelength depending on the production lot, can be accurately corrected.

According to the preferred embodiments of the present invention, in the seventeenth place, the laser beam from the semiconductor laser is allowed to be incident into only the hologram pattern of the first hologram. Therefore, the second hologram which emits the signal of the read beam returning from the optical storage medium to the split detectors is not directly affected by the influences such as the wavelength fluctuation of the semiconductor laser. As a result, the position error of the beam and the beam focus error on the split detectors can be reduced to minimum.

According to the preferred embodiments of the present invention, in the eighteenth place, the two hologram patterns of the second hologram are formed at positions substantially symmetric with each other with respect to the line orthogonally crossing the line that connects the two hologram patterns of the first hologram. Therefore, positioning on the optical axis on the detector becomes easier.

According to the preferred embodiments of the present invention, in the nineteenth place, the direction of the split line of the split detectors for detecting the focus error is inclined with respect to the movement in the direction of the optical axes of the first and second holograms and in the in-plane direction so that the fluctuation of the read beam incident into the split detectors becomes small. Therefore, detection of the signal from the optical storage medium can be stably carried out.

According to the preferred embodiments of the present invention, in the twentieth place, the positions of the hologram patterns of the second hologram are set substantially point-symmetric with respect to the semiconductor laser as the point center. Therefore, the change of the beam shapes of the laser beams incident into the split detectors can be made equal in connection with the adjustment of the in-plane rotation of the first and second holograms, and the focus error of the beam resulting from the wavelength fluctuation of the semiconductor laser, etc., can be made relatively small.

According to the preferred embodiments of the present invention, in the twenty-first place, the semiconductor laser is used as the light source, and the optical substrate, e.g., substrate which is equipped with the first and second holograms, and two split detectors for detecting the focus error, are formed integrally with one another. Therefore, a small and light-weight optical device, which can be applied to various optical storage units, can be produced.

In the optical device according to the present invention, the interference fringes of the first hologram are formed so as to gradually become dense from the coarse center towards the dense outer portion, the interference fringes of the second hologram are formed so as to gradually become coarse from the dense center portion towards the coarse outer portion, and the components of the interference fringes in these first and second holograms are only the unidirectional component. Therefore, it becomes possible to easily avoid the deterioration of image-formability of the laser beam resulting from the wavelength fluctuation of the semiconductor laser or the disposition error of the optical substrate having the holograms formed thereon. As a result, the margin can be improved at the time of production of the holograms, and the production margin of the overall optical system can be improved, too.

According to the preferred embodiments of the present invention, in the twenty-second place, the phase transmission function of each of the first and second holograms comprises the off-axis component of only the unidirectional component and the parabolic phase, and the phase transmission functions of the two holograms offset each other. Therefore, even when the wavelength of the semiconductor laser fluctuates, the position at which the beam of the return path forms the image hardly deviates, and the collapse of the beam diameter, which adversely affects the detection of the focus error, does not occur.

According to the preferred embodiments of the present invention, in the twenty-third place, the interference fringes themselves of the first and second holograms are rotated integrally with the first and second holograms, and the positions of the laser beams which form the image on two split detectors for detecting the focus error are deviated in the direction orthogonally crossing the line that connects these two laser beams. Therefore, the present invention is effective in the case in which it is technically difficult to mount the semiconductor laser for emitting the laser beam and the detectors for receiving the laser beams to the same position.

We claim:

1. An optical element utilized for an optical storage unit including:
   an optical substrate made of a material allowing the transmission of a laser beam emitted from a semiconductor laser, and disposed between the semiconductor laser and an optical storage unit including an optical storage medium;
   a first hologram formed on said optical substrate in such a manner as to transmit the laser beam emitted from the semiconductor laser, and to allow it to be incident into said optical storage medium and to diffract the laser beam reflected by said optical storage medium into said optical substrate;
   a second hologram formed on said optical substrate in such a manner as to transmit one of two polarization components contained in said laser beam diffracted by said first hologram and propagating inside said optical substrate, to diffract another one of said two polarization components and to thus separate said two polarization components; and
   a third hologram formed on said optical substrate in such a manner as to diffract the laser beam diffracted by said first hologram;
   wherein said first hologram is disposed in such a manner that the direction of a grating thereof is at right angles to the direction of linear polarization of said laser beam emitted from said semiconductor laser, and said second hologram is disposed in such a manner that the direction of a grating thereof is optically inclined at 45° to the direction of the grating of said first hologram.

2. An optical element according to claim 1, wherein said third hologram includes a plurality of hologram patterns for detecting the focus error for said optical storage medium and a plurality of hologram patterns for detecting the tracking error, and the laser beam diffracted by each of said hologram patterns is incident into separate detection means.

3. An optical device utilized for an optical storage unit including:
   a semiconductor laser for emitting a laser beam;
   an optical substrate made of a material allowing the transmission of said laser beam, and disposed between said semiconductor laser and an optical storage unit including an storage medium;

a first hologram formed on said optical substrate in such a manner as to transmit said laser beam emitted from said semiconductor laser, and to allow it to be incident into said optical storage medium and to diffract said laser beam reflected by said optical storage medium into said optical substrate; and a second hologram formed on said optical substrate wherein said first hologram is disposed in such a manner that the direction of a grating thereof is at right angles to the direction of linear polarization of said laser beam emitted from said semiconductor laser, and said second hologram is disposed in such a manner that the direction of a grating thereof is optically inclined at 45° to the direction of the grating of said first hologram.

4. An optical device utilized for an optical storage unit including:

a semiconductor laser for emitting a laser beam;

an optical substrate made of a material allowing the transmission of said laser beam, and disposed between said semiconductor laser and a magneto-optical recording medium inside an optical storage unit;

a first hologram formed on said optical substrate in such a manner as to transmit said laser beam emitted from said semiconductor laser, and to allow it to be incident into said magneto-optical recording medium and to diffract said laser beam reflected by said magneto-optical recording medium into said optical substrate;

a second hologram formed on said optical substrate; and a third hologram formed on said optical substrate in such a manner as to diffract said laser beam diffracted by said first hologram wherein said first hologram is disposed in such a manner that the direction of a grating thereof is at right angles to the direction of linear polarization of said laser beam emitted from said semiconductor laser, and said second hologram is disposed in such a manner that the direction of a grating thereof is optically inclined at 45° to the direction of the grating of said first hologram.

5. An optical device according to claim 4, wherein said first hologram is formed on a surface of said optical substrate opposing said magneto-optical recording medium, and said second and third holograms are formed on a surface of said optical substrate not opposing said magneto-optical recording medium.

6. An optical device according to claim 4, wherein a slope is formed on said optical substrate, so that said laser beam diffracted by said first hologram, then propagating inside said optical substrate and thereafter reflected totally inside said optical substrate can be perpendicularly incident into said second hologram.

7. An optical device according to claim 4, wherein, when the spatial frequency of a grating of said first hologram or said second hologram is f, and the wavelength of said laser beam emitted from said semiconductor laser is $\lambda$, the relation $(f \times \lambda) \geq 1.4$ is satisfied.

8. An optical device according to claim 4, wherein said third hologram includes a plurality of hologram patterns for detecting the focus error for said magneto-optical recording medium and a plurality of hologram patterns for detecting the tracking error, and said laser beam diffracted by each of said hologram patterns is incident into separate detection means.

9. An optical device according to claim 4, wherein said second hologram is formed around said third hologram in such a manner as to encompass said third hologram.

10. An optical device according to claim 4, wherein said third hologram is formed at the position of passage of said laser beam diffracted to the opposite side to said laser beam diffracted by said first hologram in such a manner as to travel towards said second hologram.

11. An optical device according to claim 6, wherein a phase compensation film for compensating the phases so that no phase difference occurs between two orthogonally crossing polarization components of said laser beam totally reflected inside said optical substrate is formed on said slope.

12. An optical device according to claim 8, wherein said third hologram has a circular shape as a whole which is divided by an H-shaped form into sets of hologram patterns, each said set of hologram patterns for detecting either one of the focus error and the tracing error, wherein one of said sets of hologram patterns is formed on right and left side portions of said third hologram, and another of said sets of hologram patterns is formed on upper and lower portions between said right and left side portions.

13. An optical device according to claim 3, wherein:

two split detectors for detecting the focus error and two detectors for detecting the tracking error are formed integrally with one another;

said first and second holograms for converting the wave front of said laser beam emitted from a bare chip of said semiconductor laser are formed on the face and back of a substrate constituting said optical substrate, respectively;

said first hologram positioned on the surface of said hologram opposite to the bare chip side comprises four hologram patterns, said second hologram positioned on the bare chip side comprises two hologram patterns, and said hologram patterns of said first hologram and said hologram patterns of said second hologram are formed at spatially and mutually different positions, respectively;

said laser beam from said semiconductor laser passes through said first hologram, is incident into said optical storage medium and then returns as a read beam to said first hologram;

a first read beam propagating from one of said hologram patterns of said first hologram to one of said hologram patterns of said second hologram and diffracted by said hologram pattern and a second read beam propagating from another hologram pattern of said first hologram to the other hologram pattern of said second hologram and diffracted by said hologram pattern are guided to said split detectors for detecting the focus error so as to detect the focus error; and a third read beam diffracted by still another hologram pattern of said first hologram and the fourth read beam diffracted by still another hologram pattern of said first hologram are guided to said detector for detecting the tracking error so as to detect the tracking error.

14. An optical device according to claim 13, wherein said split detectors for detecting the focus error, and said detectors for detecting the track error are formed on the same base substrate, which is disposed in the base of said optical device.

15. An optical device according to claim 13, wherein said split detectors for detecting the focus error and said detectors for detecting the tracking error are arranged in the position which is deviated from an optical axis of said laser beam emitted from said semiconductor laser.

16. An optical device according to claim 13, wherein said optical substrate, which serves as an optical element utilized for said optical storage unit, is mounted on said base substrate.

17. An optical device according to claim 13, wherein said hologram patterns of said first hologram pattern and said hologram patterns of said second hologram correct longitudinal and transverse aberrations on said split detectors for detecting the focus error resulting from the wavelength fluctuation of said semiconductor laser or from variance of the wavelength, when said first read beam and said second read beam are diffracted by said hologram patterns of said first hologram and said hologram patterns of said second hologram, and the size of the luminous flux of said laser beams, incident into said hologram patterns of said first hologram, is reduced when it passes through said hologram patterns of said second hologram.

18. An optical device according to claim 13, wherein said hologram patterns of said second hologram are formed at position into which said laser beam from said semiconductor laser is not incident, and said laser beam from said semiconductor laser is incident into only said hologram patterns of said first hologram.

19. An optical device according to claim 13, wherein the positions of said hologram patterns of said second hologram pattern, the positions of said split detectors for detecting the focus error corresponding to said hologram patterns, respectively, and the positions of said hologram patterns of said first hologram on the opposite surface side of said first hologram to the bare chip side are substantially symmetric with one another with respect to a line orthogonally crossing the line connecting said hologram pattern to said hologram pattern of said first hologram.

20. An optical device according to claim 13, wherein the direction of the split line of said split detectors for detecting the focus error is inclined with respect to the directions of the optical axes of said first and second holograms and to the movement in the in-plane direction so that the change of light intensity of the beam incident into said split detector becomes small.

21. An optical device according to claim 13, wherein the positions of said hologram patterns of said second hologram pattern and the positions of said split detectors for detecting the focus error, corresponding to said hologram patterns are substantially point-symmetric with one another, respectively, with respect to said semiconductor laser as being the point center so that the change of the beam shapes of said laser beams incident into said split detectors becomes equal in connection with adjustment of the in-plane rotation of said first and second holograms.

22. An optical device according to claim 17, wherein the positions of said hologram patterns of said second hologram exist at the positions into which said laser beam from said semiconductor laser is not incident, and said laser beam from said semiconductor laser is incident into only said hologram patterns of said first hologram.

23. An optical device according to claim 17, wherein the direction of the split line of said split detectors for detecting the focus error is inclined so that the change of light intensity of the beams incident into said split detectors becomes small with respect to the movement of said first and second holograms in the direction of the optical axes and in the in-plane direction.

24. An optical device according to claim 17, wherein the positions of said hologram patterns of said second hologram and the positions of said split detectors for detecting the focus error, corresponding to said hologram patterns, are substantially point-symmetric with one another, respectively, with said semiconductor laser being the point center so that the change of the beam shapes of said laser beams incident into said split detectors becomes equal in connection with adjustment of the in-plane rotation of said first and second holograms.

25. An optical device according to claim 18, wherein the direction of the split line of said split detectors for detecting the focus error is inclined with respect to the movement of said first and second holograms in the directions of the optical axes and in the in-plane direction.

26. An optical device according to claim 18, wherein the positions of said hologram patterns of said second hologram and the positions of said split detectors for detecting the focus error corresponding to said hologram patterns are substantially point-symmetric with one another with respect to said semiconductor laser being the point center so that the change of the beam shapes of said laser beams incident into said split detectors becomes equal with respect to adjustment of in-plane rotation of said first and second holograms.

27. An optical device according to claim 3, wherein:

two split detectors for detecting the focus error are integrally formed by utilizing said first and second holograms;

said first and second holograms for converting the wave front of said laser beam emitted from the bare chip of said semiconductor laser are formed on the face and back of a substrate constituting said optical substrate, respectively;

said laser beam from said semiconductor laser passes through said first hologram, is then incident into said optical storage medium and thereafter returns as a return beam to said first hologram, and the read beam propagating from said first hologram to said second hologram and diffracted by said second hologram is guided to said split detectors for detecting the focus error; and the interference fringes of said first hologram are formed so as to gradually become dense from the coarse center portion towards the dense outer portions whereas the interference fringes of said second hologram are formed so as to gradually become coarse from the dense center portion towards the coarse outer portion, or otherwise the interference fringes of said first hologram are formed so as to gradually become coarse from the dense center portion towards the coarse outer portion whereas the interference fringes of said second hologram are formed so as to gradually become dense from the coarse center portion towards the dense outer portion, and each component of the interference fringes of each of said first and second holograms is only a unidirectional component.

28. An optical device according to claim 27, wherein, when the wavelength of said laser beam from said semiconductor laser is $\lambda$, the phase transmission functions of said first and second holograms are expressed by:

$$\phi(x, y) = (2\pi/\lambda)(g1 \cdot x + g2 \cdot x^2)$$

$$\phi(x, y) = (2\pi/\lambda)(h1 \cdot x + h2 \cdot x^2)$$

and each of said phase transmission functions comprises an off-axis component of only unidirectional component and a parabolic phase.

29. An optical device according to claim 28, wherein the interference fringes themselves of said first and second holograms having said phase transmission functions are rotated integrally with said first and second holograms, so as to deviate the positions of two laser beams that form images on said two split detectors for detecting the focus error, in a direction orthogonally crossing the line connecting said two laser beams, and to avoid alignment of said semiconductor laser and said split detectors on the same straight line.

* * * * *